US008642109B2

(12) United States Patent
Baumer et al.

(10) Patent No.: US 8,642,109 B2
(45) Date of Patent: Feb. 4, 2014

(54) HIGH PROTEIN NUGGETS AND APPLICATIONS IN FOOD PRODUCTS

(75) Inventors: Craig R. Baumer, St. Louis, MO (US); Santiago Solorio, Bridgeton, MO (US); Phillip I. Yakubu, St. Louis, MO (US)

(73) Assignee: Solae, LLC, St. Louis, MO (US)

( * ) Notice: Subject to any disclaimer, the term of this patent is extended or adjusted under 35 U.S.C. 154(b) by 696 days.

(21) Appl. No.: 11/286,753

(22) Filed: Nov. 23, 2005

(65) Prior Publication Data

US 2006/0188641 A1    Aug. 24, 2006

Related U.S. Application Data

(63) Continuation-in-part of application No. 10/817,741, filed on Apr. 2, 2004, now abandoned.

(51) Int. Cl.
*A23L 1/00*    (2006.01)

(52) U.S. Cl.
USPC ........... 426/656; 426/634; 426/445; 426/447; 426/448

(58) Field of Classification Search
USPC ........................... 426/656, 634, 445, 447, 448
See application file for complete search history.

(56) References Cited

U.S. PATENT DOCUMENTS

| | | | | | |
|---|---|---|---|---|---|
| 3,730,729 | A | * | 5/1973 | Strommer | 426/508 |
| 3,753,728 | A | * | 8/1973 | Bedenk et al. | 426/44 |
| 3,911,157 | A | * | 10/1975 | Bates et al. | 426/459 |
| 3,958,032 | A | * | 5/1976 | Merriam | 426/580 |
| 4,310,558 | A | * | 1/1982 | Nahm, Jr. | 426/98 |
| 4,418,086 | A | * | 11/1983 | Marino et al. | 426/302 |
| 4,743,460 | A | * | 5/1988 | Gellman et al. | 426/549 |
| 4,888,198 | A | * | 12/1989 | Beery et al. | 426/656 |
| 5,165,949 | A | * | 11/1992 | Farnsworth et al. | 426/496 |
| 5,437,885 | A | * | 8/1995 | Lusas et al. | 426/302 |
| 5,538,748 | A | * | 7/1996 | Boatman et al. | 426/516 |
| 6,635,301 | B1 | * | 10/2003 | Howsam | 426/574 |
| 2004/0161519 | A1 | * | 8/2004 | Walsh et al. | 426/583 |
| 2005/0058759 | A1 | * | 3/2005 | Schmidt | 426/549 |
| 2005/0089623 | A1 | * | 4/2005 | Fannon | 426/656 |

* cited by examiner

*Primary Examiner* — Anthony Weier

(57) ABSTRACT

The present invention relates to food materials containing a high concentration of protein and processes for their manufacture. More particularly, the present invention relates to protein extrudates containing high concentrations of soy protein, dairy protein, and mixtures thereof and low concentrations of carbohydrates, processes for manufacturing such protein extrudates, and the use of such protein extrudates as functional food ingredients.

6 Claims, 5 Drawing Sheets

HIGH PROTEIN NUGGETS AND APPLICATIONS IN FOOD PRODUCTS

CROSS REFERENCE TO RELATED APPLICATIONS

This application is a continuation-in-part patent application of U.S. patent application Ser. No. 10/817,741, entitled HIGH SOY PROTEIN NUGGETS AND APPLICATIONS IN FOOD PRODUCTS, filed on Apr. 2, 2004, now abandoned.

FIELD OF THE INVENTION

The present invention relates to food materials containing a high concentration of vegetable protein dairy protein, and mixtures thereof and processes for their manufacture. More particularly, the present invention relates to protein extrudates containing high concentrations of vegetable protein, dairy protein and mixtures thereof and low concentrations of carbohydrates, processes for manufacturing such protein extrudates, and the use of such protein extrudates as functional food ingredients.

BACKGROUND OF THE INVENTION

Texturized protein products are known in the art and are typically prepared by heating a mixture of protein material along with water under mechanical pressure in a cooker extruder and extruding the mixture through a die. Upon extrusion, the extrudate generally expands to form a fibrous cellular structure as it enters a medium of reduced pressure (usually atmospheric). Expansion of the extrudate results from inclusion of soluble carbohydrates which reduce the gel strength of the mixture. The extrudates are then used to form other products such as vegetable meat analogs. Extrusion methods for forming textured protein meat analogs are well known and disclosed, for example, in U.S. Pat. No. 4,099,455.

Extrusion cooking devices have long been used in the manufacture of a wide variety of edible and other products such as human and animal feeds. Generally speaking, these types of extruders include an elongated barrel together with one or more internal, helically flighted, axially rotatable extrusion screws therein. The outlet of the extruder barrel is equipped with an apertured extrusion die. In use, a material to be processed is passed into and through the extruder barrel and is subjected to increasing levels of temperature, pressure and shear. As the material emerges from the extruder die, it is fully cooked and shaped and may typically be subdivided using a rotating knife assembly. Conventional extruders of this type are described, for example, in U.S. Pat. Nos. 4,763,569, 4,118,164 and 3,117,006, which are incorporated herein by reference.

Attempts to develop processes for producing suitable meat substitutes from vegetable protein sources include extrusion cooking defatted soy flour or other vegetable proteins in order to texturize and orient the vegetable protein and produce meat extenders in the form of texturized protein products for use with hamburger or similar products. Exemplary processes of this type are taught in U.S. Pat. Nos. 3,047,395; 3,142,571; 3,488,770 and 3,870,805. Although these extrusion processes have met with a certain degree of acceptance in the art, the meat substitute products heretofore produced have possessed several characteristics which have seriously limited their use, particularly as full substitutes for meat. One of the most persistent objections to those prior products stems from the expanded, cellular, spongy nature thereof. In particular, most of these meat extenders are produced under high pressure and temperature conditions in the extrusion cooker which results in a twisted, randomly oriented meat extender. After rehydration, these extenders are characterized by a chewy structure of twisted layers lacking the appearance, mouth feel or range of utility of meat. This has for the most part limited the use of these products to the role of meat extenders in ground hamburger type meats and the like. Moreover, if too much of the prior vegetable protein product is employed in such hamburger-type meats, the extended meat becomes unacceptably spongy and exhibits a random, unappealing appearance and mouth feel.

Alternatively, the texturized protein product may be cut into smaller extrudates such as "nuggets" or powders for use as food ingredients or as functional food products.

Regardless of its form, texturized protein products must have an acceptable density, texture, and mouth feel for use as a food ingredient. Thus, conventional texturized protein products typically have a protein content of from about 40% to about 60% by weight on a moisture-free basis. Increasing the protein content of the texturized product has not been feasible because a significant fraction of carbohydrate has been deemed necessary to provide the protein extrudate with an acceptable texture and density. But in certain instances high carbohydrate functional food ingredients are undesirable to consumers wishing to reduce carbohydrate intake. Thus, a need exists for a high protein, low carbohydrate texturized protein product having an acceptable density, texture and mouth feel for use as a functional food ingredient.

SUMMARY OF THE INVENTION

The present invention discloses novel protein extrudates having a high concentration of protein and a low concentration of carbohydrates. The extrudates have a lower density than conventional protein extrudates containing high levels of protein. The protein extrudates typically have a color L value of greater than 50. The extrudates can be used as an ingredient or a source of protein in food products. The novel protein extrudates can be obtained using vegetable protein products and dairy protein products either alone or in various combinations depending on the desired attributes of the finished product.

Briefly, therefore, in one embodiment, the present invention is directed to a protein extrudate comprising at least about 70% by weight vegetable protein on a moisture-free basis and having a density of from about 0.10 g/cm$^3$ to about 0.40 g/cm$^3$.

In one embodiment, the present invention is directed to a protein extrudate comprising at least about 70% by weight dairy protein on a moisture-free basis and having a density of from about 0.10 g/cm$^3$ to about 0.40 g/cm$^3$.

In one embodiment, the present invention is directed to a protein extrudate comprising at least about 70% by weight vegetable protein, dairy protein and mixtures therof on a moisture-free basis and having a density of from about 0.10 g/cm$^3$ to about 0.40 g/cm$^3$.

In another embodiment, the present invention is directed to a protein extrudate comprising unhydrolyzed vegetable protein and at least about 2 parts by weight hydrolyzed protein per part by weight unhydrolyzed protein.

In another embodiment, the present invention is directed to a protein extrudate comprising unhydrolyzed dairy protein and at least about 2 parts by weight hydrolyzed protein per part by weight unhydrolyzed protein.

In another embodiment, the present invention is directed to a protein extrudate comprising unhydrolyzed vegetable protein, dairy protein and mixtures thereof and at least about 2 parts by weight hydrolyzed protein per part by weight unhydrolyzed protein.

In a further embodiment, the present invention is directed to a protein extrudate comprising at least about 70% by weight unhydrolyzed vegetable protein on a moisture-free basis and having a density from about 0.10. g/cm$^3$ to about 0.40 g/cm$^3$.

In a further embodiment, the present invention is directed to a protein extrudate comprising at least about 70% by weight unhydrolyzed dairy protein on a moisture-free basis and having a density from about 0.10. g/cm$^3$ to about 0.40 g/cm$^3$.

In a further embodiment, the present invention is directed to a protein extrudate comprising at least about 70% by weight unhydrolyzed vegetable protein, dairy protein and mixtures thereof on a moisture-free basis and having a density from about 0.10. g/cm$^3$ to about 0.40 g/cm$^3$.

In another embodiment, the present invention is directed to a functional food ingredient comprising from about 40% to about 95% by weight meat material and up to about 4% by weight of a protein product on a total weight basis, the protein product comprising at least about 70% by weight protein on a moisture-free basis and having a density of from about 0.10 g/cm$^3$ to about 0.40 g/cm$^3$. The protein can be vegetable protein, dairy protein, and mixtures thereof. The vegetable proteins are derived from seed crops selected from the groups of cereal grains, legumes and mixtures thereof. The dairy proteins include caseinates, whey and mixtures thereof.

In another embodiment, the present invention is directed to a low density snack food product including a majority solids component and a water component with the majority solids component including at least protein. The food product comprises protein in the range of between about 25% and about 95% by weight of majority solids component and water, the protein can be vegetable protein, dairy protein and mixtures thereof, water in the range of between about 1% and about 7% by weight of solids and water; and the product is characterized by having a crisp texture, a density in the range of between about 0.02 g/cm$^3$ and about 0.5 g/cm$^3$ based on the weight of solids component and water. The vegetable proteins are derived from seed crops selected from the groups of cereal grains, legumes and mixtures thereof. The dairy proteins include caseinates, whey and mixtures thereof.

In another embodiment, the present invention is directed to a low density, low moisture content proteinaceous food product comprising a principal solid component and containing between about 1% and about 7% water. The principal solid component comprises protein in a concentration between about 25% and about 95% by weight of the sum of the water content of the product and the dry basis weight of the principal solid component, the product being characterized by a crisp texture and a density in the range between about 0.02 g/cm$^3$ and about 0.5 g/cm$^3$ based on the weight of said principal solid component and water. The proteins can be vegetable proteins, dairy proteins, and mixtures thereof. The vegetable proteins are derived from seed crops selected from the groups of cereal grains, legumes and mixtures thereof. The dairy proteins include caseinates, whey and mixtures thereof.

In another embodiment, the present invention is directed to a low density, low moisture content proteinaceous food product comprising a proteinaceous solid matrix and containing between about 1% and about 7% water. The matrix comprises protein in a concentration between about 25% and about 95% by weight of the sum of the water content of the product and the dry basis weight of said matrix, the product being characterized by a crisp texture, a density in the range between about 0.02 g/cm$^3$ and about 0.5 g/cm$^3$. The proteins can be vegetable proteins, dairy proteins, and mixtures thereof. The vegetable proteins are derived from seed crops selected from the groups of cereal grains, legumes and mixtures thereof. The dairy proteins include caseinates, whey and mixtures thereof.

In another embodiment, the present invention is directed to a low density, low moisture content proteinaceous food product comprising a proteinaceous solid extrudate and containing between about 1% and about 7% water. The extrudate comprises protein in a concentration between about 25% and about 95% by weight of the sum of the water content of the product and the dry basis weight of said extrudate, the product being characterized by a crisp texture, a density in the range between about 0.02 g/cc and about 0.5 g/cc. The proteins can be vegetable proteins, dairy proteins, and mixtures thereof. The vegetable proteins are derived from seed crops selected from the groups of cereal grains, legumes and mixtures thereof. The dairy proteins include caseinates, whey and mixtures thereof.

In another embodiment, the present invention is directed to a low density, low moisture content proteinaceous food product comprising between about 1% and about 7% water and between about 25% and about 95% by weight of protein, wet basis, the product being characterized by a crisp texture, and a density in the range between about 0.02 g/cm$^3$ and about 0.5 g/cm$^3$. The proteins can be vegetable proteins, dairy proteins, and mixtures thereof. The vegetable proteins are derived from seed crops selected from the groups of cereal grains, legumes and mixtures thereof. The dairy proteins include caseinates, whey and mixtures thereof.

In a further embodiment, the present invention is directed to a cocoa protein extrudate comprising at least about 70% by weight protein on a moisture-free basis and having a density of from about 0.10 g/cm$^3$ to about 0.40 g/cm$^3$. The protein can be vegetable protein, dairy protein and mixtures thereof. The vegetable proteins are derived from seed crops selected from the groups of cereal grains, legumes and mixtures thereof.

The dairy proteins include caseinates, whey and mixtures thereof.

DETAILED DESCRIPTION OF THE PREFERRED EMBODIMENTS

Figure 1:
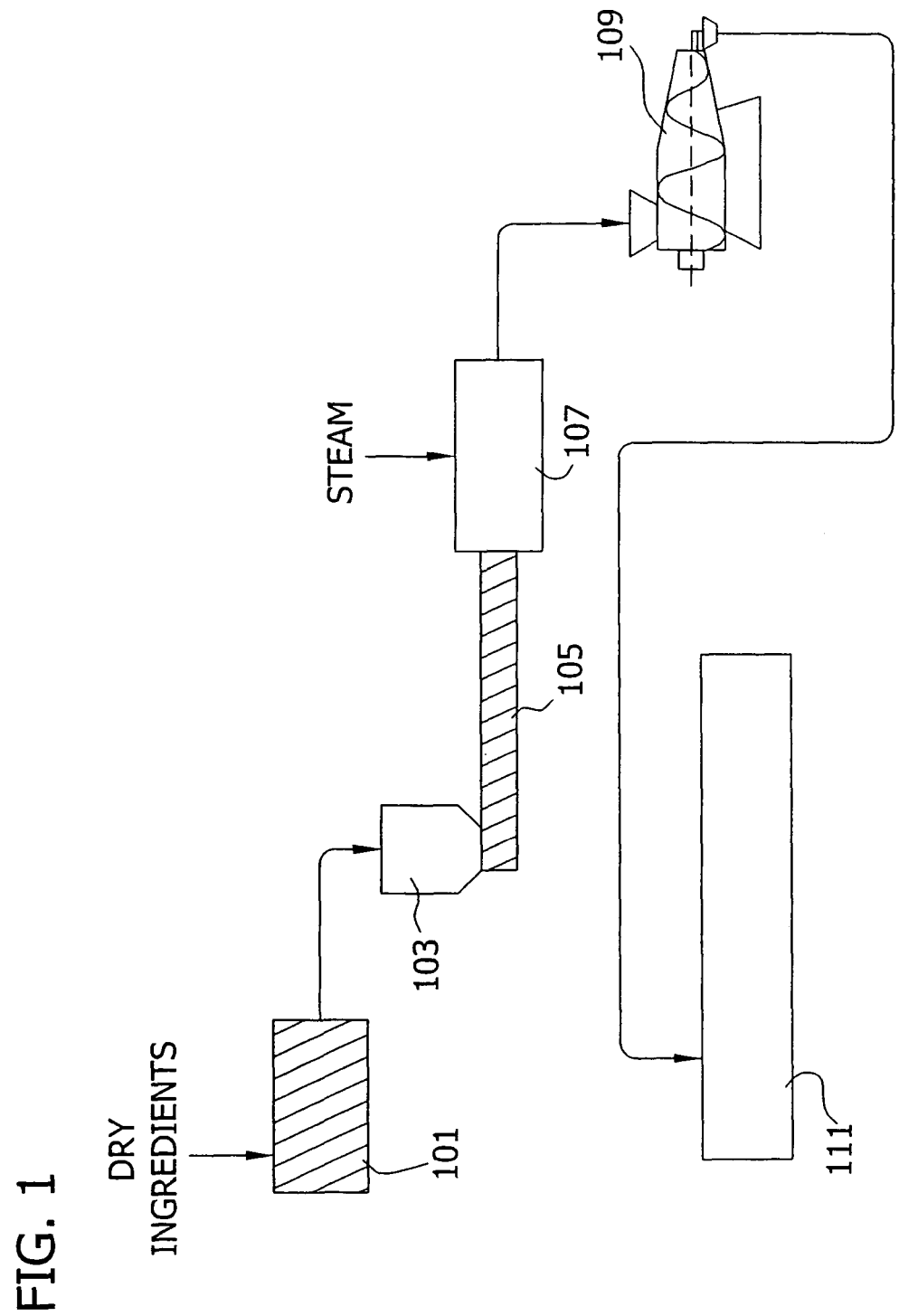
FIG. 1 is a schematic flow sheet of a process useful in preparing the protein extrudates of the present invention.

In accordance with the present invention, it has been discovered that textured protein products containing high concentrations of protein and low concentrations of carbohydrates can be manufactured to have a desired density and an acceptable texture using extrusion technology. Such protein extrudates can be formed as "nuggets" or pellets for use as an ingredient or source of protein in health and nutrition bars, snack bars and ready to eat cereal. Alternatively, the protein extrudates may be further processed for use as a binder, a stabilizer or a source of protein in beverages, health and nutrition bars, dairy, and baked and emulsified/ground meat food systems. In certain embodiments, the protein extrudates may be ground into fine particles (i.e., powder) to allow for incorporation into soy beverages. Such ground particles typically have a particle size of from approximately 1 to about 5 μm to allow suspension in a liquid.

A process of the present invention for preparing protein extrudates generally comprises forming a pre-conditioned feed mixture by contacting the feed mixture with moisture, introducing the pre-conditioned feed mixture into an extruder barrel, heating the pre-conditioned feed mixture under mechanical pressure to form a molten extrusion mass, and extruding the molten extrusion mass through a die to produce a protein extrudate.

The protein-containing feed mixture typically comprises at least one source of protein and has an overall protein concentration of at least about 70% protein by weight on a moisture-free basis. Proteins contained in the feed mixture may be obtained from one or more suitable sources including, for example, dairy protein materials and vegetable protein materials. Dairy protein materials include, for example, casein, caseinate, sweet dairy whey, and acid derived dairy whey. The term whey is defined as including whey derived from sweet dairy whey or acid derived whey. Vegetable protein materials may be obtained from cereal grains such as wheat, corn, and barley, and vegetables such as legumes, including soybeans and peas. Preferably, when the feed mixture contains vegetable proteins a soy protein material is the source of the protein, and when the feed mixture contains dairy proteins, calcium caseinate, sodium caseinate, whey and mixtures thereof is the source of the protein.

Suitable soy protein materials include soy flakes, soy flour, soy grits, soy meal, soy protein concentrates, soy protein isolates, and mixtures thereof. The primary difference between these soy protein materials is the degree of refinement relative to whole soybeans. Soy flakes are generally produced by dehulling, defatting, and grinding the soybean and typically contain less than about 65 wt. % soy protein on a moisture-free basis. Soy flakes also contain soluble carbohydrates, insoluble carbohydrates such as soy fiber, and fat inherent in soy. Soy flakes may be defatted, for example, by extraction with hexane. Soy flours, soy grits, and soy meals are produced from soy flakes by comminuting the flakes in grinding and milling equipment such as a hammer mill or an air jet mill to a desired particle size. The comminuted materials are typically heat treated with dry heat or steamed with moist heat to "toast" the ground flakes and inactivate anti-nutritional elements present in soy such as Bowman-Birk and Kunitz trypsin inhibitors. Heat treating the ground flakes in the presence of significant amounts of water is avoided to prevent denaturation of the soy protein in the material and to avoid costs involved in the addition and removal of water from the soy material. The resulting ground, heat treated material is a soy flour, soy grit, or a soy meal, depending on the average particle size of the material. Soy flour generally has a particle size of less than about 150 μm. Soy grits generally have a particle size of about 150 to about 1000 μm. Soy meal generally has a particle size of greater than about 1000 μm.

Soy protein concentrates typically contain about 65 wt. % to about 85 wt. % soy protein, with the major non-protein component being fiber. Soy protein concentrates are typically formed from defatted soy flakes by washing the flakes with either an aqueous alcohol solution or an acidic aqueous solution to remove the soluble carbohydrates from the protein and fiber. On a commercial scale, considerable costs are incurred with the handling and disposing of the resulting waste stream.

Soy protein isolates, more highly refined soy protein materials, are processed to contain at least 90% soy protein and little or no soluble carbohydrates or fiber. Soy protein isolates are typically formed by extracting soy protein and water soluble carbohydrates from defatted soy flakes or soy flour with an alkaline aqueous extractant. The aqueous extract, along with the soluble protein and soluble carbohydrates, is separated from materials that are insoluble in the extract, mainly fiber. The extract is typically then treated with an acid to adjust the pH of the extract to the isoelectric point of the protein to precipitate the protein from the extract. The precipitated protein is separated from the extract, which retains the soluble carbohydrates, and is dried after being adjusted to a neutral pH or is dried without any pH adjustment. On a commercial scale, these steps contribute significant cost to the product.

Any dairy protein material can be used to make the protein extrudate. Suitable dairy proteins include caseinates, such as calcium caseinate and sodium caseinate, and whey, including whey protein isolates and whey protein concentrates. The dairy proteins can be hydrolyzed, unhydrolyzed and mixtures thereof.

In preparation of the high protein extrudates, a feed mixture comprising at least about 70 wt. % protein, on a moisture-free basis (i.e., dry basis), is prepared. More preferably, the feed mixture comprises at least about 80% by weight protein on a moisture-free basis and, still more preferably, the feed mixture comprises at least about 90% by weight protein on a moisture-free basis.

The overall protein content of the feed mixture may be achieved by a combination (i.e., blend) of suitable sources of protein described above.

In certain embodiments, when soy protein is used, it is preferred for soy protein isolates to constitute one or more of the sources of protein contained in the feed mixture. This is generally due to the higher degree of refinement of soy protein isolates as compared to the other soy protein materials described above and, in particular, due to soy protein isolates containing the highest protein content and lowest carbohydrate content of the soy protein materials. For example, a preferred feed mixture formulation may comprise a blend of two or more soy protein isolates. Other suitable formulations may comprise a soy protein concentrate in combination with a soy protein isolate. Typically, a protein-containing feed mixture comprising one or more soy protein isolates contains from about 75% to about 100% by weight soy protein isolate on a moisture-free basis and, accordingly, from about 70% to about 95% by weight protein.

Generally, the bulk density of the source of soy protein, dairy protein, or blend of sources is from about 0.20 g/cm$^3$ to about 0.50 g/cm$^3$ and, more typically, from about 0.24 g/cm$^3$ to about 0.44 g/cm$^3$.

In certain embodiments in which the feed mixture comprises a plurality of soy protein materials, it is desired that at least one of the soy protein materials exhibits low viscosity and low gelling properties. The viscosity and/or gelling properties of an isolated soy protein may be modified by a wide variety of methods known in the art. For example, the viscosity and/or gelling properties of a soy protein isolate may be decreased by partial hydrolysis which partially denatures the protein materials. Typically, soy protein materials treated in this manner are described in terms of degree of hydrolysis which can be determined based on molecular weight distributions, sizes of proteins and chain lengths, or breaking down of beta-conglycinin or glycinin storage proteins. As used herein, the term "percent degree of hydrolysis" of a sample is defined as the percentage of cleaved peptide bonds out of the total number of peptide bonds in the sample. The proportion of cleaved peptide bonds in a sample can be measured by calculating the amount of trinitrobenzene sulfonic acid (TNBS) that reacts with primary amines in the sample under controlled conditions.

Trinitrobenzene sulfonic acid (TNBS) reacts under controlled conditions with the primary amines of proteins to produce a chromophore which absorbs light at 420 nm. The intensity of color produced from the TNBS-amine reaction is proportional to the total number of amino terminal groups and therefore is an indicator of the degree of hydrolysis of a sample. In conducting the TNBS assay, 0.2 ml of 0.3 M TNBS solution is reacted with 2 ml of a protein sample prepared by slurrying 0.1 grams of protein material in 100 ml of 0.0245 N NaOH. The reaction is carried out in the presence of a 9.5 pH sodium borate buffer. The reaction is allowed to proceed for 15 minutes after which time the reaction is terminated and the absorbance of the reaction solution and the protein sample are measured. The absorbance values provide the TNBS value which represents the moles of free amino acids produced per 100 kg of protein which is calculated according to the following formula: TNBS value=$(As_{420}-Ab_{420}) \times (8.073) \times (1/W) \times F \times 100/P$. $As_{420}$ is the TNBS absorbance of the sample. $Ab_{420}$ is the TNBS absorbance of the reaction solution. W is the weight of sample. F is the inverse of dilution factor of the measured sample to the sample produced by the reaction (i.e., diluting the reaction sample by a factor of 10 before measuring its absorbance provides a dilution factor of 0.1). 8.073 is the extinction coefficient and dilution factor/unit conversion for the procedure. P is the protein content of the sample determined using the Kjeldahl method described below. Such measurement procedures are described, for example, by Adler-Nissen in *J. Agric. Food Chem.*, Vol. 27(6), p. 1256 (1979).

Percent (%) degree of hydrolysis is determined from the TNBS value using the following equation: % degree of hydrolysis=$((TNBS_{value}-24)/885) \times 100$. 24 is the correction for lysyl amino group of a non-hydrolyzed sample and 885 is the moles of amino acid per 100 kg of protein.

The Nitrogen-Ammonia-Protein Modified Kjeldahl Method of A.O.C.S. Methods Bc4-91 (1997), Aa 5-91 (1997), and Ba 4d-90(1997) used in the determination of the protein content may be performed as follows with a soy material sample. 0.0250-1.750 grams of the soy material are weighed into a standard Kjeldahl flask. A commercially available catalyst mixture of 16.7 grams potassium sulfate, 0.6 grams titanium dioxide, 0.01 grams of copper sulfate, and 0.3 grams of pumice is added to the flask, then 30 milliliters of concentrated sulfuric acid is added to the flask. Boiling stones are added to the mixture, and the sample is digested by heating the sample in a boiling water bath for approximately 45 minutes. The flask should be rotated at least 3 times during the digestion. 300 milliliters of water is added to the sample, and the sample is cooled to room temperature. Standardized 0.5N hydrochloric acid and distilled water are added to a distillate receiving flask sufficient to cover the end of a distillation outlet tube at the bottom of the receiving flask. Sodium hydroxide solution is added to the digestion flask in an amount sufficient to make the digestion solution strongly alkaline. The digestion flask is then immediately connected to the distillation outlet tube, the contents of the digestion flask are thoroughly mixed by shaking, and heat is applied to the digestion flask at about a 7.5-min boil rate until at least 150 milliliters of distillate is collected. The contents of the receiving flask are then titrated with 0.25N sodium hydroxide solution using 3 or 4 drops of methyl red indicator solution—0.1% in ethyl alcohol. A blank determination of all the reagents is conducted simultaneously with the sample and similar in all respects, and correction is made for blank determined on the reagents. The moisture content of the ground sample is determined according to the procedure described below (A.O.C.S Official Method Ba 2a-38). The nitrogen content of the sample is determined according to the formula: Nitrogen (%)=$1400.67 \times [[(Normality of standard acid) \times (Volume of standard acid used for sample (ml))]-[(Volume of standard base needed to titrate 1 ml of standard acid minus volume of standard base needed to titrate reagent blank carried through method and distilled into 1 ml standard acid (ml)) \times (Normality of standard base)]-[(Volume of standard base used for the sample (ml)) \times (Normality of standard base)]]/(Milligrams of sample)$. The protein content is 6.25 times the nitrogen content of the sample for soy protein and 6.38 times the nitrogen content of the sample for dairy protein.

The term "moisture content" as used herein refers to the amount of moisture in a material. The moisture content of a soy material and/or dairy material can be determined by A.O.C.S. (American Oil Chemists Society) Method Ba 2a-38 (1997), which is incorporated herein by reference in its entirety. According to the method, the moisture content of the material may be measured by passing a 1000 gram sample of the material through a 6×6 riffle divider, available from Seedboro Equipment Co., Chicago, Ill., and reducing the sample size to 100 grams. The 100 gram sample is then immediately placed in an airtight container and weighed. 5 grams of the sample are weighed onto a tared moisture dish (minimum 30 gauge, approximately 50×20 millimeters, with a tight-fitting slip cover—available from Sargent-Welch Co. (Buffalo Grove, Ill.)). The dish containing the sample is placed in a forced draft oven and dried at 130+/–3° C. for 2 hours. The dish is then removed from the oven, covered immediately, and cooled in a dessicator to room temperature. The dish is then weighed. Moisture content is calculated according to the formula: Moisture content (%)=$100 \times [(loss in mass (grams)/mass of sample (grams)]$.

Hydrolyzed protein materials used in accordance with the process of the present invention typically exhibit TNBS values of less than about 160, more typically less than about 115 and, still more typically, from about 30 to about 70.

Hydrolyzed soy protein and/or dairy whey protein sources sufficient for use as a low viscosity/low gelling material in the process of the present invention typically have a degree of hydrolysis of less than about 15%, more typically less than about 10% and, still more typically, from about 1% to about 5%. In the case of soy protein isolates, the hydrolyzed soy protein material typically comprises a partially hydrolyzed isolate having a degree of hydrolysis of from about 1% to about 5%.

Suitable methods for hydrolysis of soy protein sources include acid hydrolysis and caustic hydrolysis. Soy protein sources (e.g., a soy protein isolate) may also be hydrolyzed by treatment of the material with an enzyme such as a protease obtained from a plant or microbial source; for example, contacting the isolate with a protease at a pH of from about 7 to about 8. Suitable proteolytic enzymes include bromelin and papain. It is currently believed that proteolytic hydrolysis attacks certain peptide bonds, thereby reducing the molecular weights of certain proteins present in the proteins in the feed mixture.

The viscosity and/or gelling properties of dairy whey protein may also be modified by partial hydrolysis. Hydrolysis may be carried out by, for example, treating the dairy whey protein with a proteolytic enzyme. Suitable proteolytic enzymes include, for example, bromelin, papain, and rennin.

Gel strength, expressed in terms of the extent of gelation (G) may be determined by preparing a slurry (commonly 200 grams of a slurry having a 1:5 weight ratio of soy protein, dairy protein, and mixtures thereof source to water) to be placed in an inverted frustoconical container which is placed on its side to determine the amount of the slurry that flows from the container. The container has a capacity of approximately 150 ml (5 ounces), height of 7 cm, top inner diameter of 6 cm, and a bottom inner diameter of 4 cm. The slurry sample of the soy protein and/or dairy protein source may be formed by cutting or chopping the soy protein and/or dairy protein source with water in a suitable food cutter including, for example, a Hobart Food Cutter manufactured by Hobart Corporation (Troy, Ohio). The extent of gelation, G, indicates the amount of slurry remaining in the container over a set period of time. Low viscosity/low gelling sources of soy protein and/or dairy protein suitable for use in accordance with the present invention typically exhibit an extent of gelation, on a basis of 200 grams of sample introduced to the container and taken five minutes after the container is placed on its side, of from about 1 to about 80 grams (i.e., from about 1 to about 80 grams, 0.5% to about 40%, of the slurry remains in the container five minutes after the container is placed on its side). High viscosity/medium to high gelling sources of soy protein and/or dairy protein suitable for use in accordance with the present invention typically exhibit an extent of gelation, on the same basis described above, of from about 45 to about 140 grams (i.e., from about 45 to about 140 grams, 22% to about 70%, of the slurry remains in the container five minutes after the container is placed on its side). A blend of sources comprising a low viscosity/low gelling source and a high viscosity/high gelling source typically have a gelation rate, on the same basis, of from about 20 to about 120 grams.

In accordance with one embodiment of the present invention, a low viscosity/low gelling source is preferably combined with a high viscosity/high gelling source to form the blend. The presence of the high viscosity/high gelling source reduces the risk of excessive expansion of the blend upon extrusion, provides a honeycomb structure to the extrudate, and generally contributes stability to the blend. The low viscosity/low gelling and high viscosity/high gelling sources can be combined in varying proportions depending on the desired characteristics of the extrudate.

In a preferred embodiment, the protein-containing feed mixture typically comprises a blend of soy protein isolates, dairy protein and mixtures thereof comprising at least about 2 parts by weight of a hydrolyzed (i.e., generally low viscosity/low gelling) soy protein isolate, dairy protein and mixtures thereof per part by weight of an unhydrolyzed (i.e., generally high viscosity/high gelling) soy protein isolate, dairy protein and mixtures thereof, more typically at least about 3 parts by weight of a hydrolyzed soy protein isolate, dairy protein and mixtures thereof per part by weight of an unhydrolyzed soy protein isolate, dairy protein and mixtures thereof and, still more typically, at least about 4 parts by weight of a hydrolyzed soy protein isolate, dairy protein and mixtures thereof per part by weight of an unhydrolyzed soy protein isolate, dairy protein and mixtures thereof. Preferably, the blend of soy protein isolates, dairy protein and mixtures thereof comprises from about 2 parts by weight to about 8 parts by weight of a hydrolyzed soy protein isolate, dairy protein and mixtures thereof per part by weight of an unhydrolyzed soy protein isolate, dairy protein and mixtures thereof. More preferably, the blend of soy protein isolates, dairy protein and mixtures thereof comprises from about 4 parts by weight to about 6 parts by weight of a hydrolyzed soy protein isolate, dairy protein and mixtures thereof per part by weight of an unhydrolyzed soy protein isolate, dairy protein and mixtures thereof.

Blends comprising a plurality of soy protein isolates, dairy protein and mixtures thereof, one of which is a low viscosity/low gelling source produced by partial hydrolysis of a soy protein isolate, dairy protein and mixtures thereof typically comprise from about 60% to about 100% by weight of a hydrolyzed soy protein isolate, dairy protein and mixtures thereof on a moisture-free basis and from about 0% to about 33% by weight of an unhydrolyzed soy protein isolate, dairy protein and mixtures thereof on a moisture-free basis. More typically, such blends comprise from about 60% to about 90% by weight of a hydrolyzed soy protein isolate, dairy protein and mixtures thereof on a moisture-free basis and from about 0% to about 20% by weight of an unhydrolyzed soy protein isolate, dairy protein and mixtures thereof on a moisture-free basis. More typically, such blends comprise from about 60% to about 90% by weight of a hydrolyzed soy protein isolate, dairy protein and mixtures thereof on a moisture-free basis and from about 5% to about 20% by weight of an unhydrolyzed soy protein isolate, dairy protein and mixtures thereof on a moisture-free basis. Still more typically, such blends comprise from about 65% to about 85% by weight of a hydrolyzed soy protein isolate, dairy protein and mixtures thereof on a moisture-free basis and from about 10% to about 20% by weight of an unhydrolyzed soy isolate, dairy protein and mixtures thereof on a moisture-free basis. Even more typically, such blends comprise from about 65% to about 75% by weight of a hydrolyzed soy protein isolate, dairy protein and mixtures thereof on a moisture-free basis and from about 15% to about 20% by weight of an unhydrolyzed soy protein isolate, dairy protein and mixtures thereof on a moisture-free basis. With respect to certain protein sources (e.g., casein) higher ratios of unhydrolyzed to hydrolyzed protein are acceptable, up to and including 100% casein.

Suitable isolated soy protein sources exhibiting a low viscosity and/or low gelling (i.e., partially hydrolyzed) for use as a low viscosity/low gelling soy protein material include SUPRO® 670, SUPRO® 710, and SUPRO® 8000 available from The Solae Company (St. Louis, Mo.), and PROFAM 931 and PROFAM 873 available from Archer Daniels Midland (Decatur, Ill.). For SUPRO® 670, SUPRO® 710, and SUPRO® 8000 the degree of hydrolysis can range from 0.5%-5.0%. The molecular weight distribution of each of these isolates can be determined by size exclusion chromatography.

Suitable sources of high viscosity and/or medium/high gelling isolated soy protein (i.e., unhydrolyzed) for use as the second soy protein isolate include SUPRO® 620, SUPRO® 500E, SUPRO® 630, and SUPRO® EX33 available from The Solae Company (St. Louis, Mo.); PROFAM 981 available from Archer Daniels Midland (Decatur, Ill.); and PROLISSE soy protein isolate available from Cargill Soy Protein Solutions, Inc. (Minneapolis, Minn.).

Table 1 provides molecular weight distributions for certain of the commercial SUPRO® products mentioned above.

TABLE 1

Estimated Molecular Weight Distribution of SUPRO ® products determined at an absorbance of 280 nm using HPLC-SEC (High Performance Liquid Chromatography - Size Exclusion Chromatography) gel filtration in 6M guanidine HCl.

| Product | >50,000 | 20,000-50,000 | 5000-20,000 | 2000-5000 |
|---|---|---|---|---|
| SUPRO ® 620 | 21% | 44% | 30% | 5% |
| SUPRO ® 670 | 7% | 17% | 55% | 21% |
| SUPRO ® 710 | 2% | 12% | 55% | 31% |

Suitable sources for soy protein when preparing the protein extrudate containing 100% unhydrolyzed soy protein include SUPRO® 620, SUPRO® 500E, SUPRO® 630, and SUPRO® EX33 available from The Solae Company (St. Louis, Mo.); PROFAM 981 available from Archer Daniels Midland (Decatur, Ill.); and PROLISSE soy protein isolate available from Cargill Soy Protein Solutions, Inc. (Minneapolis, Minn.).

Rice flour, Fibrim, and soy lecithin powder can be added to control expansion of the protein extrudate.

Suitable sources of dairy protein include calcium caseinate, sodium caseinate, whey protein isolates, whey protein concentrates, and mixtures thereof. In particular, whey protein isolates can be Bipro or Biozate 3 available from Davisco Foods, Inc. (Eden Prairie, Minn.). Whey protein concentrate can be WPC80 obtained from Farbest Brands (Plain City, Ohio).

The color intensity of the protein extrudate can be adjusted using cocoa powder, caramel, and mixtures thereof. Increasing the amount of cocoa powder and/or caramel yields darker, more intensely colored nuggets. Cocoa is added to the protein-containing feed mixture in the form of cocoa powder. Typically, the protein-containing feed mixture comprises from about 1% to about 8% by weight cocoa powder on a moisture-free basis. (Moisture-free basis and dry basis are used interchangeably throughout the Specification.) Any cocoa powder may be used, such as Cocoa Powder from Bloomer Chocolate (Chicago, Ill.) and ADM Cocoa, Archer Daniels Midland (Decatur, Ill.).

Color intensity of the protein extrudate is measured using a color-difference meter such as a Hunterlab colorimeter to obtain a color L value, a color A value, and a color B value. Because the method is measuring the color of an irregular shaped surface, a minimum of six (6) separate color measurements are taken and averaged to obtain consistent results.

The scientific basis for the measurement of color is the existence of three different color-response mechanisms in the human eye. The spectral responses of these light-receiving devices to different wave lengths are well known. In order to quantify a color stimulus, the responses of the color sensing devices to different wave lengths have been standardized into a table called the CIE Standard Observer.

The Hunterlab colorimeter is a tristimulus instrument that measures color in L, A, and B values by using a filter that spectrally approximates the CIE Standard Observer functions of the eye. The L, A, and B scales give measurements of color in visual units of color perception that relate to perceived color and color difference. The color "L" scale measures lightness and varies from 100 for perfect white to zero for black; the color "A" scale measures redness when positive and greenness when negative; and the color "B" scale measures yellowness when positive and blueness when negative.

When using the Hunterlab colorimeter, first the L, A and B scales of the colorimeter are checked with the white calibration tile. Next, the instrument is standardized using the black glass and white tile. The sample cup is checked for any imperfections. The sample cup is then filled with the nuggets until the cup is about ½ to ¾ full. The filled sample cup is placed over the instrument measuring port (light source). The cup should be centered over the light source. The sample cup is covered with the sample cover. The nugget samples are measured for color (L, A, and B) six (6) times and then averaged. Discard the nugget sample and repeat the steps until all 6 samples have been run. The Hunterlab colorimeter will then display the average values for L, A, and B. The L, A, and B scale values obtained for the nugget sample are reported as the sample color. The control sample must be a soy protein isolate nugget having a color value (L, A, and B values) within the range of the sample being evaluated. It must be a well mixed sample and kept in an airtight container at room temperature. The mean value established for the control is obtained by averaging the results of 24 separate trials. This data is generated by evaluating the sample six (6) separate times on four (4) different days. The control sample is to be evaluated once every 8 hours. If the control is not within the established range (mean±standard deviation); check the L, A, and B scales with white calibration tile. If the colorimeter is calibrated according to the calibration tile, stop routine testing and investigate possible variables that could effect results such as: 1. Zero scale adjustment; 2. Source lamp; 3. Dirty or damaged calibration tiles; and 4. Establish a new control every 12 months.

The protein-containing feed mixture may also contain one or more soluble carbohydrate sources in an amount of from about 0.001% to about 20% by weight soluble carbohydrates on a moisture-free basis. Typically, the protein-containing feed mixture comprises from about 0% to about 10% by weight soluble carbohydrates on a moisture-free basis. Suitable sources of soluble carbohydrates include, for example, cereals, tubers and roots such as rice (e.g., rice flour), wheat, corn, barley, potatoes (e.g., native potato starch), and tapioca (e.g., native tapioca starch).

In addition to soluble carbohydrates, the feed mixture may also contain insoluble carbohydrate such as soy fiber which does not contribute to nutritive carbohydrate load and which, generally, is present as an aid in processing of the mixture because the fiber serves to facilitate flowability and expansion of the feed mixture. When soy fiber is present in the mixture to serve either as filler to increase the volume of the mixture or as a processing aid, the amount of fiber present can vary widely. Generally, however, the feed mixture comprises from about 0.001% to about 5% by weight fiber and, more generally, from about 1% to about 3% by weight fiber. Soy fiber absorbs moisture as the extrusion mass flows through the extrusion barrel to the die. A modest concentration of soy fiber is believed to be effective in obstructing cross-linking of protein molecules, thus preventing excessive gel strength from developing in the cooked extrusion mass exiting the die. Unlike the protein, which also absorbs moisture, soy fiber readily releases moisture upon release of pressure at the die exit temperature. Flashing of the moisture released contributes to expansion, i.e., "puffing," of the extrudate, thus conducing to the formation of the low density extrudate of the invention.

Referring now to FIG. 1, one embodiment of the process of the present invention is shown. The process comprises introducing the particular ingredients of the protein-containing feed mixture formulation into a mixing tank 101 (i.e., an ingredient blender) to combine the ingredients and form a protein feed pre-mix. The pre-mix is then transferred to a hopper 103 where the pre-mix is held for feeding via screw feeder 105 to a pre-conditioner 107 to form a conditioned feed mixture. The conditioned feed mixture is then fed to an extrusion apparatus (i.e., extruder) 109 in which the feed mixture is heated under mechanical pressure generated by the screws of the extruder to form a molten extrusion mass. The molten extrusion mass exits the extruder through an extrusion die.

In pre-conditioner 107, the particulate solid ingredient mix is preheated, contacted with moisture, and held under controlled temperature and pressure conditions to allow the moisture to penetrate and soften the individual particles. The pre-conditioning step increases the bulk density of the particulate feed mixture and improves its flow characteristics. The pre-conditioner 107 contains one or more paddles to promote uniform mixing of the feed and transfer of the feed mixture through the preconditioner. The configuration and rotational speed of the paddles vary widely, depending on the capacity of the preconditioner, the extruder throughput and/or the desired residence time of the feed mixture in the preconditioner or extruder barrel. Generally, the speed of the paddles is from about 500 to about 1300 revolutions per minute (rpm).

Typically, the protein-containing feed mixture is pre-conditioned prior to introduction into the extrusion apparatus 109 by contacting a pre-mix with moisture (i.e., steam and/or water) at a temperature of at least about 45° C. (110° F.). More typically, the feed mixture is conditioned prior to heating by contacting a pre-mix with moisture at a temperature of from about 45° C. (110° F.) to about 85° C. (185° F.). Still more typically, the feed mixture is conditioned prior to heating by contacting a pre-mix with moisture at a temperature of from about 45° C. (110° F.) to about 70° C. (160° F.). It has been observed that higher temperatures in the preconditioner may encourage starches to gelatinize, which in turn may cause lumps to form which may impede flow of the feed mixture from the preconditioner to the extruder barrel.

Typically, the pre-mix is conditioned for a period of about 30 to about 60 seconds, depending on the speed and the size of the conditioner. More typically, the pre-mix is conditioned for a period of from about 40 to about 50 seconds, most typically about 45 seconds. The pre-mix is contacted with steam and/or water and heated in the pre-conditioner 107 at generally constant steam flow to achieve the desired temperatures. The water and/or steam conditions (i.e., hydrates) the feed mixture, increases its density, and facilitates the flowability of the dried mix without interference prior to introduction to the extruder barrel where the proteins are texturized. In certain embodiments, the feed mixture pre-mix is contacted with both water and steam to produce a conditioned feed mixture. For example, experience to date suggests that it may be preferable to add both water and steam to increase the density of the dry mix as steam contains moisture to hydrate the dry mix and also provides heat which promotes hydration of the dry mix by the water.

The conditioned pre-mix may contain from about 5% to about 25% by weight water. Preferably, the conditioned pre-mix contains from about 5% to about 15% by weight water. The conditioned pre-mix typically has a bulk density of from about 0.25 g/cm³ to about 0.6 g/cm³. Generally, as the bulk density of the pre-conditioned feed mixture increases within this range, the feed mixture is easier to process. This is presently believed to be due to such mixtures occupying all or a majority of the space between the screws of the extruder, thereby facilitating conveying the extrusion mass through the barrel.

The conditioned pre-mix is generally introduced to the extrusion apparatus 109 at a rate of no more than about 10 kilograms (kg)/min (no more than about 20 lbs/min). Typically, the conditioned pre-mix is introduced to the barrel at a rate of from about 2 to about 10 kg/min (from about 5 to about 20 lbs/min), more typically from about 5 to about 10 kg/min (from about 10 to about 20 lbs/min) and, still more typically, from about 6 to about 8 kg/min (from about 12 to about 18 lbs/min). Generally, it has been observed that the density of the extrudate decreases as the feed rate of pre-mix to the extruder increases. The residence time of the extrusion mass in the extruder barrel is typically less than about 60 seconds, more typically less than about 30 seconds and, still more typically, from about 15 to about 30 seconds.

Typically, extrusion mass passes through the barrel at a rate of from about 7.5 kg/min to about 40 kg/min (from about 17 lbs/min to about 85 lbs/min). More typically, extrusion mass passes through the barrel at a rate of from about 7.5 kg/min to about 30 kg/min (from about 17 lbs/min 65 lbs/min). Still more typically, extrusion mass passes through the barrel at a rate of from about 7.5 kg/min to about 22 kg/min (from about 17 lbs/min to about 50 lbs/min). Even more typically, extrusion mass passes through the barrel at a rate of 7.5 kg/min to about 15 kg/min (from about 17 lbs/min to about 35 lbs/min).

Various extrusion apparatus suitable for forming a molten extrusion mass from a feed material comprising vegetable protein, dairy protein, or mixtures thereof are well known in the art. One suitable extrusion apparatus is a double-barrel, twin screw extruder as described, for example, in U.S. Pat. No. 4,600,311. Examples of commercially available double-barrel, twin screw extrusion apparatus include a CLEXTRAL Model BC-72 extruder manufactured by Clextral, Inc. (Tampa, Fla.) having an L/D ratio of 13.5:1 and four heating zones; a WENGER Model TX-57 extruder manufactured by Wenger (Sabetha, Kans.) having an L/D ratio of 14:1 and four heating zones; and a WENGER Model TX-52 extruder manufactured by Wenger (Sabetha, Kans.) having an L/D ratio of 14:1 and four heating zones. Other suitable extruders include CLEXTRAL Models BC-82 and BC-92 and WENGER Models TX-138, TX-144, TX-162, and TX-168.

The ratio of the length and diameter of the extruder (L/D ratio) generally determines the length of extruder necessary to process the mixture and affects the residence time of the mixture therein. Generally the L/D ratio is greater than about 10:1, greater than about 15:1, greater than about 20:1, or even greater than about 25:1.

The screws of a twin screw extruder can rotate within the barrel in the same or opposite directions. Rotation of the screws in the same direction is referred to as single flow whereas rotation of the screws in opposite directions is referred to as double flow.

The speed of the screw or screws of the extruder may vary depending on the particular apparatus. However, the screw speed is typically from about 250 to about 350 revolutions per minute (rpm), more typically from about 250 to about 335 rpm and, still more typically, from about 270 to about 305 rpm. Generally, as the screw speed increases, the density of the extrudates decreases.

The extrusion apparatus 109 generally comprises a plurality of heating zones through which feed mixture is conveyed under mechanical pressure prior to exiting the extrusion apparatus 109 through an extrusion die. The temperature in each successive heating zone generally exceeds the temperature of the previous heating zone by between about 10° C. and about 70° C. (between about 15° F. and about 125° F.), more generally by between about 10° C. and about 50° C. (from about 15° F. to about 90° F.) and, more generally, from about 10° C. to about 30° C. (from about 15° F. to about 55° F.).

Typically, the temperature in the last heating zone is from about 90° C. to about 150° C. (from about 195° F. to about 300° F.), more typically from about 100° C. to about 150° C.

(from about 212° F. to about 300° F.) and, still more typically, from about 100° C. to about 130° C. (from about 210° F. to about 270° F.).

Typically, the temperature in the next to last heating zone is from about 80° C. to about 120° C. (from about 175° C. to about 250° C.) and, more typically, from about 90° C. to about 110° C. (from about 195° F. to about 230° F.).

Typically, the temperature in the heating zone immediately before the next to last heating zone is from about 70° C. to about 100° C. (from about 160° F. to about 210° F.) and, more typically, from about 80° C. to about 90° C. (from about 175° F. to about 195° F.).

Typically, the temperature in the heating zone separated from the last heating zone by two heating zones is from about 60° C. to about 90° C. (from about 140° F. to about 195° F.) and, more typically, from about 70° C. to about 80° C. (from about 160° F. to about 175° F.).

Typically, the extrusion apparatus comprises at least about three heating zones and, more typically, at least about four heating zones. In a preferred embodiment, the conditioned pre-mix is transferred through four heating zones within the extrusion apparatus, with the feed mixture heated to a temperature of from about 100° C. to about 150° C. (from about 212° F. to about 302° F.) such that the molten extrusion mass enters the extrusion die at a temperature of from about 100° C. to about 150° C. (from about 212° F. to about 302° F.).

In such an embodiment, the first heating zone is preferably operated at a temperature of from about 60° C. to about 90° C. (from about 140° F. to about 195° F.), the second heating zone is operated at a temperature of from about 70° C. to about 100° C. (from about 160° F. to about 212° F.), the third heating zone is operated at a temperature of from about 80° C. to about 120° C. (from about 175° F. to about 250° F.) and the fourth heating zone is operated at a temperature of from about 90° C. to about 150° C. (from about 195° F. to about 302° F.).

The temperature within the heating zones may be controlled using suitable temperature control systems including, for example, Mokon temperature control systems manufactured by Clextral (Tampa, Fla.). Steam may also be introduced to one or more heating zones via one or more valves in communication with the zones to control the temperature.

Apparatus used to control the temperature of the heating zones may be automatically controlled. One such control system includes suitable valves (e.g., solenoid valves) in communication with a programmable logic controller (PLC).

The pressure within the extruder barrel is not narrowly critical. Typically the extrusion mass is subjected to a pressure of at least about 400 psig (about 28 bar) and generally the pressure within the last two heating zones is from about 1000 psig to about 3000 psig (from about 70 bar to about 210 bar). The barrel pressure is dependent on numerous factors including, for example, the extruder screw speed, feed rate of the mixture to the barrel, feed rate of water to the barrel, and the viscosity of the molten mass within the barrel.

The heating zones within the barrel may be characterized in terms of the action upon the mixture therein. For example, zones in which the primary purpose is to convey the mixture longitudinally along the barrel are generally referred to as "conveying zones" and zones in which the primary purpose is mixing are generally referred to as "mixing zones." Zones in which the primary purpose is to compress the mixture are generally referred to as "compression zones" and zones in which the primary purpose is to provide shearing of the proteins are referred to as "shearing zones." It should be understood that more than one action may occur within a zone; for example, there may be "shearing/compression" zones or "mixing/shearing" zones. The action upon the mixture within the various zones is generally determined by various conditions within the zone including, for example, the temperature of the zone and the screw profile within the zone.

The extruder is characterized by its screw profile which is determined, at least in part, by the length to pitch ratio of the various portions of the screw. Length (L) indicates the length of the screw while pitch (P) indicates the distance required for 1 full rotation of a thread of the screw. In the case of a modular screw containing a plurality of screw portions having varying characteristics, L can indicate the length of such a portion and P the distance required for 1 full rotation of a thread of the screw. The intensity of mixing, compression, and/or shearing generally increases as the pitch decreases and, accordingly, L:P increases. L:P ratios for the twin-screws within the various heating zones of one embodiment of the present invention are provided below in Table 2.

TABLE 2

| Zone | L:P | Flow |
| --- | --- | --- |
| Conveying | 200/100 | Double flow |
| Conveying | 200/100 | Double flow |
| Conveying | 150/100 | Double flow |
| Compression | 200/66 | Double flow |
| Compression | 200/66 | Double flow |
| Shearing | 100/50 | Double flow |
| Shearing | 100/40 | Single flow |
| Shearing | 100/30 (reverse) | Single flow |

Water is injected into the extruder barrel to hydrate the feed mixture and promote texturization of the proteins. As an aid in forming the molten extrusion mass the water may act as a plasticizing agent. Water may be introduced to the extruder barrel via one or more injection jets in communication with a heating zone. Typically, the mixture in the barrel contains from about 15% to about 30% by weight water. The rate of introduction of water to any of the heating zones is generally controlled to promote production of an extrudate having desired characteristics. It has been observed that as the rate of introduction of water to the barrel decreases, the density of the extrudate decreases. Typically, less than about 1 kg of water per kg of protein are introduced to the barrel and, more typically less than about 0.5 kg of water per kg of protein and, still more typically, less than about 0.25 kg of water per kg of protein are introduced to the barrel. Generally, from about 0.1 kg to about 1 kg of water per kg of protein are introduced to the barrel.

Referring again to FIG. 1, the molten extrusion mass in extrusion apparatus 109 is extruded through a die (not shown) to produce an extrudate, which is then dried in dryer 111.

Extrusion conditions are generally such that the product emerging from the extruder barrel typically has a moisture content of from about 20% to about 45% by weight wet basis and, more typically, from about 30% to about 40% by weight wet basis. The moisture content is derived from water present in the mixture introduced to the extruder, moisture added during preconditioning and/or any water injected into the extruder barrel during processing.

Upon release of pressure, the molten extrusion mass exits the extruder barrel through the die, superheated water present in the mass flashes off as steam, causing simultaneous expansion (i.e., puffing) of the material. The level of expansion of the extrudate upon exiting of mixture from the extruder in terms of the ratio of the cross-sectional area of extrudate to the cross-sectional area of die openings is generally less than about 15:1, more generally less than about 10:1 and, still more generally, less than about 5:1. Typically, the ratio of the cross-sectional area of extrudate to the cross-sectional area of die openings is from about 2:1 to about 11:1 and, more typically, from about 2:1 to about 10:1.

The extrudate is cut after exiting the die. Suitable apparatus for cutting the extrudate include flexible knives manufactured by Wenger (Sabetha, Kans.) and Clextral (Tampa, Fla.).

The dryer 111 used to dry the extrudates generally comprises a plurality of drying zones in which the air temperature may vary. Generally, the temperature of the air within one or more of the zones will be from about 135° C. to about 185° C. (from about 280° F. to about 370° F.). Typically, the temperature of the air within one or more of the zones is from about 140° C. to about 180° C. (from about 290° F. to about 360° F.), more typically from about 155° C. to 170° C. (from about 310° F. to about 340° F.) and, still more typically, from about 160° C. to about 165° C. (from about 320° F. to about 330° F.). Typically, the extrudate is present in the dryer for a time sufficient to provide an extrudate having a desired moisture content. This desired moisture content may vary widely depending on the intended application of the extrudate and, typically, is from about 2.5% to about 5.0% by weight. Generally, the extrudate is dried for at least about 5 minutes and, more generally, for at least about 10 minutes. Suitable dryers include those manufactured by Wolverine Proctor & Schwartz (Merrimac, Mass.), National Drying Machinery Co. (Philadelphia, Pa.), Wenger (Sabetha, Kans.), Clextral (Tampa, Fla.), and Buehler (Lake Bluff, Ill.).

The extrudates may further be comminuted to reduce the average particle size of the extrudate. Suitable grinding apparatus include hammer mills such as Mikro Hammer Mills manufactured by Hosokawa Micron Ltd. (England).

Preferably, the novel protein extrudates of the present invention comprise at least about 70% by weight protein on a moisture-free basis, more preferably at least about 80% by weight protein on a moisture-free basis and, still more preferably, at least about 90% by weight protein on a moisture-free basis. In one preferred embodiment, the protein extrudate comprises from about 80% to about 95% by weight protein on a moisture-free basis.

The protein extrudates comprise vegetable protein, dairy protein, and mixtures thereof and may also include other components including fiber (e.g., soy fiber and cereal fiber), carbohydrates (e.g., complex carbohydrates such as starches), and water. Preferably, a majority of the protein in the food product comprises soy proteins, dairy proteins, and mixtures thereof and, preferably, the source of a majority of the protein in the extrudate is one or more soy protein isolates, dairy proteins, and mixtures thereof. The dairy proteins include calcium caseinate, sodium caseinate, whey protein concentrate, whey protein isolate, and mixtures thereof.

In one embodiment, the protein extrudate is in the form of a low density snack product including a majority solids component and a water component. Typically, such products include between about 25% and about 95% protein on a majority solids component and water component basis.

In another embodiment, the protein extrudate is in the form a low density, low moisture content proteinaceous food product comprising a principal solid component which includes protein in a concentration of between about 25% and about 95% by weight of the water present in the product and the dry basis weight of the principal solid component. In one variation of this embodiment, the principal solid component is in the form of a proteinaceous solid matrix and, in another, a proteinaceous solid extrudate.

Generally, the protein extrudates of the present invention have a density of from about 0.1 g/cm$^3$ to about 0.4 g/cm$^3$. Preferably, the protein extrudates of the present invention have a density of from about 0.15 g/cm$^3$ to about 0.35 g/cm$^3$. In such embodiments, the density of the extrudate may be from about 0.20 g/cm$^3$ to about 0.27 g/cm$^3$, from about 0.24 g/cm$^3$ to about 0.27 g/cm$^3$, or from about 0.27 g/cm$^3$ to about 0.32 g/cm$^3$.

Low density snack food products prepared in accordance with the present invention generally have a density of from about 0.02 g/cm$^3$ to about 0.7 g/cm$^3$ and, more generally, from about 0.02 g/cm$^3$ to about 0.5 g/cm$^3$. Generally, such extrudates exhibit a crisp, non-fibrous eating texture. In certain embodiments, the products have a density of from about 0.02 g/cm$^3$ to about 0.1 g/cm$^3$ or even from about 0.02 g/cm$^3$ to about 0.05 g/cm$^3$. Low density, low moisture content proteinaceous food products comprising a principal solid component typically exhibit such densities.

In a preferred embodiment, the protein extrudates of the present invention comprise hydrolyzed soy protein and unhydrolyzed soy protein as described above. Typically, the protein extrudate comprises at least about 1 part by weight hydrolyzed soy protein per part by weight unhydrolyzed soy protein and, more preferably at least 2 parts by weight hydrolyzed soy protein per part by weight unhydrolyzed soy protein.

More typically, the protein extrudate comprises from about 2 to about 8 parts by weight hydrolyzed soy protein per part by weight unhydrolyzed soy protein, from about 2 to about 4 parts by weight hydrolyzed soy protein per part by weight unhydrolyzed soy protein, or from about 4 to about 6 parts by weight hydrolyzed soy protein per part by weight unhydrolyzed soy protein.

In certain embodiments, the food product includes hydrolyzed soy protein and at least partially hydrolyzed soy protein isolates and unhydrolyzed soy protein (e.g., a soy protein isolate, a soy protein concentrate, or soy flour) and the partially hydrolyzed protein is present in the product in a weight ratio of between 80:20 to 55:45 to the unhydrolyzed soy protein.

Preferably, the extrudate contains less than about 20% by weight carbohydrates, more preferably less than about 10% by weight carbohydrates, still more preferably less than about 5% by weight and, even more preferably, from about 2% to about 5% by weight carbohydrates.

Carbohydrate (i.e., starch) present in the feed mixture typically forms microparticles of starch gels under the conditions of the extruder barrel caused by denaturing of starches. Thus, the starch present is partially gelatinized. The degree of starch gelatinization of the starch portions of the extrudate may be determined by a starch iodine test or by polarized microscopy. Typically, the starch present in the extrudate exhibits a degree of gelatinization of from about 70% to about 90%. While the starch is not present in an amount sufficient to provide a gelatinous character to the extrudate, its degree of gelatinization can be used as a measure of the degree of "cooking" of the extrusion mass within the barrel as generally increased temperatures are necessary for gelatinization of starches.

Typically, the extrudates contains from about 0.001% to about 5% by weight fiber on a moisture free basis and, more typically, from about 1% to about 3% by weight fiber on a moisture free basis. Fiber in the extrusion mass aids in expansion of the extrusion mass as it exits the extrusion die. It is presently believed that fiber in the extrusion mass disrupts formation of bonds between proteins which generally form a matrix which tends to trap water present in the mixture and prevent expansion. This disruption of bond formation and the natural tendency of the fiber to release water facilitates flashing of water from the extrusion mass as steam and expansion of the extrusion mass.

In addition to protein, the majority solids component or principal solid component of food products of the present invention may comprise other solid components (i.e., fillers) such as carbohydrates or fibers. The product may include filler in a ratio of filler to protein in the range of from about 5:95 to about 75:25. In certain embodiments, a majority of the filler is starch. Suitable starches include rice flour, potato, tapioca, and mixtures thereof.

Generally, water is present in the dried extrudate at a concentration of from about 2% to about 5.5% by weight. The amount of water may vary depending on other characteristics of the extrudate (e.g., carbohydrate content and density).

Low density food products of the present invention including a majority solids component or a principal solid component typically contain water at a concentration of between about 1% and about 7% by weight of protein, filler, and water and, more typically, between about 3% and about 5% by weight of protein, filler, and water.

The protein extrudates comprised of soy protein, dairy protein and mixtures thereof disclose a variety of protein combinations. The main ingredient for the combination of soy protein isolate and whey protein is the soy protein isolate SUPRO® 8000 (The Solae Company, St. Louis, Mo.), which is a hydrolyzed soy protein isolate. Soy protein isolate and native tapioca starch are used to help create expansion in the extrudates and obtain the desired product density. These ingredients release the water trapped during the extrusion cooking process; the shrinkage ratio when the water is released in the form of steam is minimized when soy protein isolate and native tapioca starch are in the formula, they form larger cells in product structure. The larger cells, change the concentration of cells and increases the air space in product texture. The result is lower density products.

Whey protein concentrate and whey protein isolates, inhibit expansion in extrusion. They release the water trapped as a consequence of change in pressure, but the shrinkage and elasticity of the extrudates reduces the texture cell size; it makes products that are denser and crispier.

Dicalcium phosphate and soy lecithin powder function also to modify the cell structure in final products and they help improve the flow ability of the process.

The protein extrudates of the present invention may further be characterized as having a hardness of at least about 1000 grams. Typically, the protein extrudates have a hardness of from about 1000 to about 50,000 grams and, more typically, from about 30,000 to about 45,000 grams. The hardness of the extrudates is generally determined by placing an extrudate sample in a container and crushing the sample with a probe. The force required to break the sample is recorded; the force that is required to crush the sample based on its size or weight is proportional to the hardness of the product. The hardness of the extrudates may be determined using a TA.TXT2 Texture Analyzer having a 25 kg load cell, manufactured by Stable Micro Systems Ltd. (England). Extrudates having a chewy texture are preferred in certain embodiments. Generally, such extrudates have a hardness of less than about 40,000 grams.

The protein extrudates may exhibit a wide range of particle sizes and may generally be characterized as an oval or round nugget or pellet. The following weight percents for characterizing the particle sizes of the extrudates of the present invention are provided on an "as is" (i.e., moisture-containing) basis.

In certain embodiments, the particle size of the extrudate is such that from about 5% to about 10% by weight of the particles are retained on a 6 Mesh Standard U.S. sieve, from about 80% to about 90% by weight of the particles are retained on an 8 Mesh Standard U.S. sieve, from about 5% to about 10% by weight are retained on a 10 Mesh Standard U.S. sieve, and from about 1% to about 3% by weight of the particles pass through a 10 Mesh Standard U.S. Sieve.

Such extrudates typically have a length of from about 3 to about 7 mm and, more typically, about 5 mm. The width of such extrudates is typically from about 0.5 to about 3.5 mm and, more typically, about 2 mm.

Figure 2:
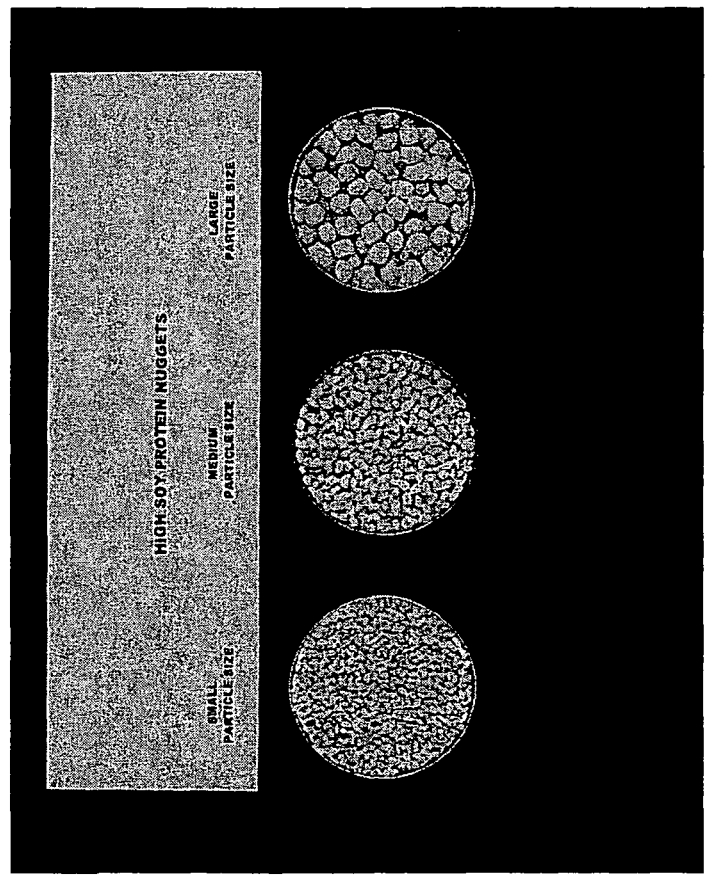
FIG. 2 is a photomicrograph of high soy protein textured products prepared in accordance with the present invention.
Figure 3:
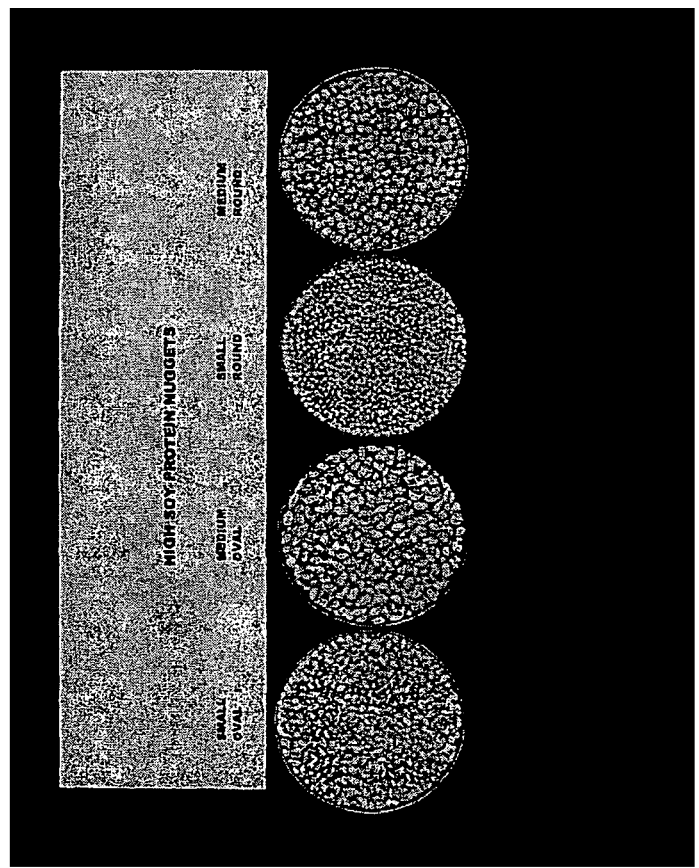
FIG. 3 is a photomicrograph of high soy protein textured products prepared in accordance with the present invention.

Extrudates having such particle sizes are shown in the photomicrographs in FIGS. 2 and 3.

Figure 4:
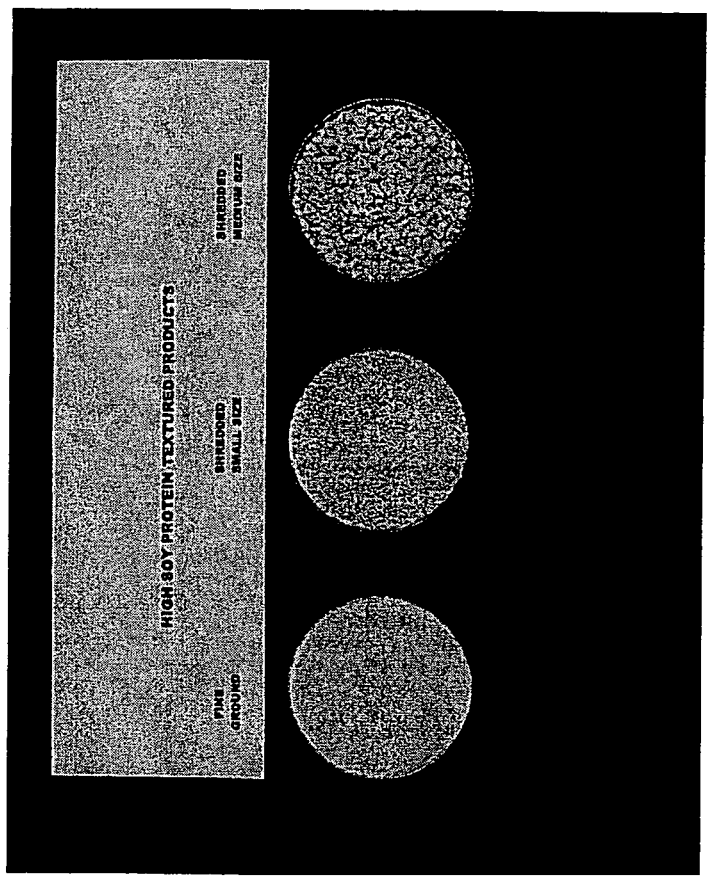
FIG. 4 is a photomicrograph of high soy protein textured products prepared in accordance with the present invention.

Extrudate nuggets having these characteristics may be shredded to produce a textured soy protein product such that from about 5% to about 10% by weight of the particles are retained on a ⅛ inch Standard U.S. sieve, from about 10% to about 20% by weight (typically about 15% by weight) of the particles are retained on a 6 Mesh Standard U.S. Sieve, from about 60% to about 80% by weight (typically 70% by weight) of the particles are retained on a 20 Mesh Standard U.S. Sieve, and from about 3% to about 5% by weight of the particles pass through a 20 Mesh Standard U.S. Sieve. Such shredded extrudates are shown in FIG. 4.

In other embodiments, the particle size of the extrudate is such that from 5% to about 10% by weight are retained on a 4 Mesh Standard U.S. sieve, from about 60% to about 80% by weight are retained on a 6 Mesh Standard U.S. sieve, from about 20% to about 40% by weight are retained on an 8 Mesh Standard U.S. sieve, and from about 1% to about 3% by weight of the particles pass through a 8 Mesh Standard U.S. Sieve.

Such extrudates typically have a length of from about 6 to about 10 mm and, more typically, about 8 mm. The width of such extrudates is typically from about 2.5 to about 5.5 mm and, more typically, about 4 mm.

Figure 5:
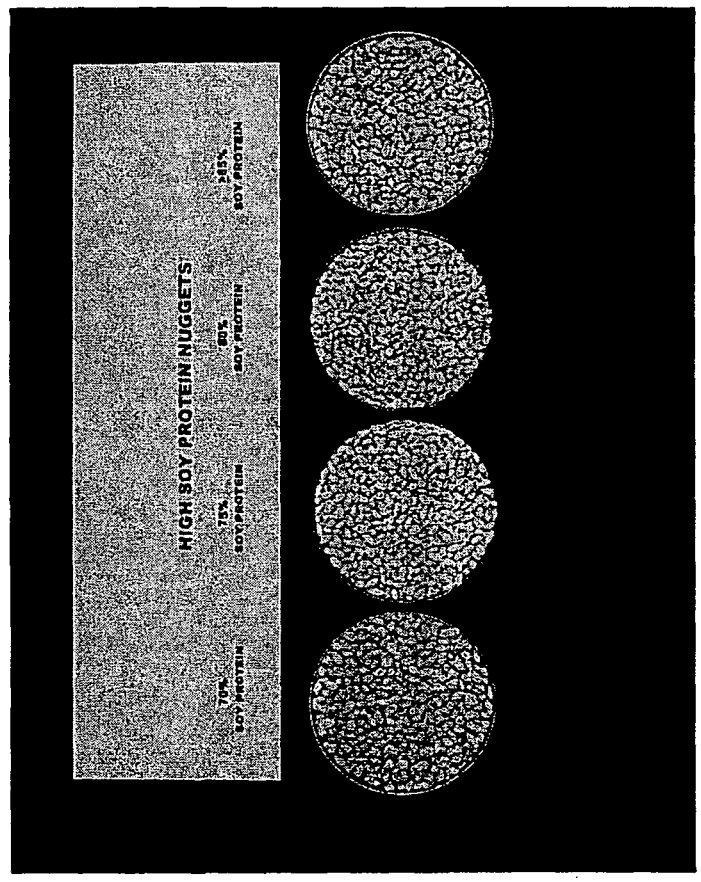
FIG. 5 is a photomicrograph of high soy protein textured products prepared in accordance with the present invention.

Extrudates having such particle sizes are shown in the photomicrographs in FIGS. 2, 3, and 5.

Extrudate nuggets having these characteristics may be shredded to produce a textured soy protein product having a particle size such that from about 10% to about 20% by weight are retained on a ¼ inch Standard U.S. sieve, from about 50% to about 80% by weight (typically about 65% by weight) are retained on a 7 Mesh Standard U.S. sieve, from about 20% to about 50% by weight (typically about 35% by weight) are retained on a 16 Mesh Standard U.S. Sieve, and from about 3% to about 5% by weight pass through a 16 Mesh Standard U.S. sieve. Such shredded extrudates are shown in FIG. 4.

In still other embodiments, the particle size of the extrudate is such that from 5% to about 10% by weight of the particles are retained on a ½ inch Standard U.S. sieve, from about 80% to about 90% by weight of the particles are retained on a ¼ inch Standard U.S. sieve, and from about 1% to about 3% by weight pass through a ¼ inch Standard U.S. Sieve.

Such extrudates typically have a length of from about 7 to about 13 mm and, more typically, about 10 mm. The width of such extrudates is typically from about 4 to about 10 mm and, more typically, about 7.5 mm. Extrudates having such particle sizes are shown in FIG. 2.

The extrudate nuggets described above may be ground to produce a powdered soy protein product. Such powder typically exhibits a particle size such that from about 2% to about 5% by weight of the powder is retained on a 200 Mesh Standard U.S. Sieve, from about 10% to about 25% by weight of the powder is retained on a 325 Mesh Standard U.S. Sieve, and from about 70% to about 100% by weight (typically about 75% by weight) of the powder passes through a 325 Mesh Standard U.S. Sieve. Ground extrudates are shown in FIG. 4.

The products can also have a wide range of pellet durability index (PDI) values usually on the order of from about 65-99, more preferably from about 80-97.

The extrudates of the present invention are suitable for incorporation into a variety of food products including, for example, food bars and ready to eat cereals. Such extrudates may generally be oval or round and may be also be shredded.

In certain embodiments, the protein extrudate is ground or comminuted as described above to produce a powdered extrudate. Typically, such powder has an average particle size of less than about 10 μm. More typically, the average particle size of the comminuted extrudate is less than about 5 μm and, still more typically, from about 1 to about 3 μm. Such powdered extrudates are suitable for incorporation into a variety of food products including, for example, beverages, dairy products (e.g., soy milk and yogurt), baked products, meat products, soups, and gravies. The protein extrudates can be incorporated in such applications in the form of nuggets or pellets, shredded nuggets or pellets, or powders as described above.

Experience to date suggests that a particle size of less than about 5 μm is particularly desirable in the case of extrudates incorporated into beverages to prevent a "gritty" taste in the product.

A particularly preferred application in which the protein extrudate of the present invention is used, is in emulsified meats. The protein extrudate product may be used in emulsified meats to provide structure to the emulsified meat, which gives the emulsified meat a firm bite and a meaty texture. The protein extrudate also decreases cooking loss of moisture from the emulsified meat by readily absorbing water, and prevents "fatting out" of the fat in the meat so the cooked meat is juicier.

The meat material used to form a meat emulsion in combination with the protein extrudate of the present invention is preferably a meat useful for forming sausages, frankfurters, or other meat products which are formed by filling a casing with a meat material, or can be a meat which is useful in ground meat applications such as hamburgers, meat loaf and minced meat products. Particularly preferred meat material used in combination with the protein extrudate includes mechanically deboned meat from chicken, beef, and pork; pork trimmings; beef trimmings; and pork backfat.

A meat emulsion containing a meat material and the ground protein extrudate contains quantities of each which are selected to provide the meat emulsion with desirable meat-like characteristics, especially a firm texture and a firm bite.

Typically, the ground protein extrudate is present in the meat emulsion in an amount of from about 0% to about 4% by weight, more typically from about 0% to about 3% by weight and, still more typically, from about 1% to about 3% by weight.

Typically, the meat material is present in the meat emulsion in an amount of from about 40% to about 95% by weight, more typically from about 50% to about 90% by weight and, still more typically, from about 60% to about 85% by weight.

The meat emulsion also contains water, which is typically present in an amount of from about 0% to about 25% by weight, more typically from about 0% to about 20% by weight, even more typically from about 0% to about 15% by weight and, still more typically, from about 0% to about 10% by weight.

The meat emulsion may also contain other ingredients that provide preservative, flavoring, or coloration qualities to the meat emulsion. For example, the meat emulsion may contain salt, typically from about 1% to about 4% by weight; spices, typically from about 0.1% to about 3% by weight; and preservatives such as nitrates, typically from about 0.001% to about 0.5% by weight.

The protein extrudate of the present invention may be used in beverage applications including, for example, acidic beverages. Typically, the ground protein extrudate is present in the beverage in an amount of from about 0.5% to about 3.5% by weight. The beverages in which the protein extrudate is incorporated typically contain from about 70% to about 90% by weight water. The beverages typically also contain sugars (e.g., fructose and sucrose) in an amount of up to about 20% by weight.

Preferred food product formulations are described below in various formulation examples.

In the case of product for the healthy diet consumer, the dried formed product has total protein (e.g., hydrolyzed and unhydrolyzed) in the range of between about 25% and 55%, by weight of dried formed product. If a mixture of partially hydrolyzed and unhydrolyzed protein is used, the ratio of at least partially hydrolyzed soy protein isolates, dairy protein and mixtures thereof to unhydrolyzed or gelling soy protein, dairy protein and mixtures thereof is in the range of between about 80:20 to about 55:45 preferably in the range of between about 60:20 to about 60:45 and most preferably about 60:40. Filler, preferably a carbohydrate such as starch (a complex carbohydrate), is present in the range of between about 50% and 75% by weight of dried formed product. The total moisture content is present as described above coating can be applied to the dried formed product as described above. Also, the above-mentioned optional ingredients can also be added, for example, nutrients, flavorants, anti-microbial agents, etc. The total fat content of the finished product, i.e., the dried formed product with flavoring and additives added thereto is less than about 5% and preferably in the range of between about 0.2% and about 5% by weight of finished product.

In the case of product for the balanced diet consumer, protein is present in the range of between about 55% and 70% by weight of dried formed product. If a mixture of partially hydrolyzed and unhydrolyzed soy protein, dairy protein and mixtures thereof is used, the ratio of at least partially hydrolyzed soy protein isolates, dairy protein and mixtures thereof to the unhydrolyzed or gelling soy protein, dairy protein and mixtures thereof is in the range of between about 80:20 to about 55:45 and preferably about 70:30. Filler, preferably starch, is present in the range of between about 30% and 50% by weight of dried formed product. Typically, balanced diet consumers prefer a higher fat content since they view fat as an important element of a balanced diet. In this event, total fat in the finished product is in the range of between about 0.2% and about 20%, and preferably in the range of between about 15% and about 20% by weight of finished product. Most of the fat is preferably added with the coating since it is desirable to not mix the fat prior to extrusion in with the components of the product that are extruded. The other ingredients as mentioned for the healthy diet consumer can also be added to this product category in approximately the same amounts.

For the high protein diet consumer product, it is preferred to add little if any filler in order to increase the protein content and reduce the carbohydrate content which to some consumers is detrimental to a high protein diet. For such a product line, the protein is present in the range of between about 70% and 95% by weight of dried formed product. The ratio of at least partially hydrolyzed soy protein isolates, dairy protein and mixtures thereof to unhydrolyzed or gelling soy protein, dairy protein and mixtures thereof is in the range of between about 80:20 and about 55:45 and preferably about 70:30.

Filler, is kept low and is present in the range of between about 0% and about 30%, preferably in the range of between about 5% and about 20% by weight of dried formed product. Fat, can be present in this type of product and would preferably be added with the coating. Fat is present in the range of between about 0.2% and about 30% and preferably in the range of between about 7% and about 20% by weight of finished product. Other optional ingredients as discussed above can be added to this type of product in approximately the same amounts.

EXAMPLES

The following examples are simply intended to further illustrate and explain the present invention. The invention, therefore, should not be limited to any of the details in these examples.

Example 1

This example illustrates the preparation of soy protein nuggets comprising 70%, 75%, 80%, 85%, and 88% soy protein using various feed mixture formulations.

The feed mixtures are described below in Table 3.

TABLE 3

| | Product | | | | |
|---|---|---|---|---|---|
| Feed composition | 70% protein | 75% protein | 80% protein | 85% protein | 88% protein |
| SUPRO ® 670 | 63.6% | 68.2% | 71.7% | 77.3% | 100% |
| SUPRO ® 620 | 15.9% | 17.0% | 17.8% | 19.3% | 0% |
| Tapioca starch | 18.2% | 12.5% | 9.0% | 3.4% | 0% |
| Fibrim | 2% | 2% | 1.2% | 0% | 0% |
| NaCl | 0.3% | 0.3% | 0.3% | 0% | 0% |

As shown in Table 3, the weight ratio of hydrolyzed to unhydrolyzed isolates is approximately 4:1 in the feed mixtures for preparing the 70%, 75%, 80%, and 85% protein nuggets. The 88% protein nuggets are prepared from a feed mixture which did not contain an unhydrolyzed isolate.

The ingredients of each feed mixture are mixed in an ingredient blender for 5 to 10 minutes to ensure uniform distribution. The dry feed mixture is pneumatically conveyed to a volumetric feeder (i.e., hopper) and fed to a pre-conditioning tank at a rate of 6.3 to 7.7 kg/min (14-17 lb/min) in which the dry mix is pre-conditioned with steam and water. Water is introduced to the pre-conditioner at a rate of 0.2 to 0.7 kg/min (0.5-1.5 lb/min) and steam is injected into a conditioning tank at a rate of 0.16 to 0.22 kg/min (0.4-0.5 lb/min or 25-30 lb/hr). The mixture in the pre-conditioner is continuously stirred with a paddle rotating at 1300-1500 rpm and the flow of steam is carefully monitored to maintain the temperature of the protein mixture within the pre-conditioner between about 60° and about 70.5° C. (140° F.-159° F.).

The dry mix is then introduced to the inlet of the extruder barrel inlet by a conveyor. Conditioned feed mix is introduced into the extruder at a rate of 6 to 9 kg/min (13.3 to 20 lb/min) using an extruder screw speed of from 275 to 320 rpm.

The extruder used is a double-barrel, twin-screw extruder, CLEXTRAL Model BC-72 manufactured by Clextral, Inc. (Tampa, Fla.) having an L/D ratio of 15:1 and four heating zones. The screw profile for the extruder is described in Table 4.

TABLE 4

| Length | Pitch |
|---|---|
| 200 | 100 |
| 200 | 100 |
| 150 | 100 |
| 200 | 66 |
| 200 | 66 |
| 100 | 50 |
| 100 | 40 |
| 100 | 30* |

*Reverse

Water is introduced into the extruder barrel at a rate of 1.8 to 2.7 kg/min (4-6 lb/min) without steam injection. The barrel temperatures are controlled with a Mokon temperature control system manufactured by Clextral (Tampa, Fla.). The extruder contains 4 heating zones through which the feed mixture passes, the temperature profile of the BC-72 extruder is shown in Table 5 below.

TABLE 5

| Pre-conditioner | Extrusion Zone 1 | Extrusion Zone 2 | Extrusion Zone 3 | Extrusion Zone 4 (Die end) |
|---|---|---|---|---|
| 60-71° C. (140-160° F.) | 28-29.5° C. (82-85.1° F.) | 93-96° C. (200-205° F.) | 132-135° C. (270-275° F.) | 140-146° C. (284-295° F.) |

The conditioned feed mix is cooked in the extruder barrel with mechanical energy generated from the extruder screw rpm/shear and electrical energy at high temperatures to reach the glass transition temperature. At high temperatures, shear, and pressure the feed mix melts and interacts with water and other ingredients to form a plastic like material which is then extruded through backup plate having a ≤1-inch (25-mm) diameter before passing through an extrusion die.

The extrudates are cut using a 6 bladed knife rotating at 2000-3000 rpm to obtain the product size, density and granulation. The die knife area is ventilated by sparging compressed air (within the cutter guard) to aid face plate cooling/product cutting.

The soy protein nuggets are dried with a Proctor single band conveyor dryer at a temperature of from about 145° C. to about 165° C. (295° F. to about 325° F.) for a residence time of 5-7 minutes. The dried soy nuggets are sieved using #3 and #8 Sweco sieves to remove the fines.

The hardness of the extrudates is determined using a texture analyzer, Model # TA.TXT2 with a 25 kg load cell manufactured by Stable Micro Systems Ltd. (England). The density and hardness of the various soy protein extrudates are summarized below in Table 6.

TABLE 6

| Protein content (%) | Density (g/cm$^3$) | Texture (g) |
|---|---|---|
| 70 | 0.235 | 21680.1 |
| 75 | 0.247 | 23918.7 |
| 80 | 0.256 | 25230.2 |
| 85 | 0.234 | 22526.4 |

The effect of varying certain process conditions for various runs used to prepare 80% soy protein nuggets are summarized below in Table 7.

TABLE 7

Effect of Extruder Screw Speed, Water Feed Rate, and Mixture Feed Rate on Power Required and Density and Texture of 80% Soy Protein Nuggets

| Run | Extruder RPM (%) | Barrel Water Feed Rate (%) | Mixture Feed Rate (%) | Power required (AMPS) | Density (g/cc) | Texture (g) |
|---|---|---|---|---|---|---|
| 1 | 90 | 80 | 85 | 80 | 0.122 | 5535.4 |
| 2 | 80 | 90 | 85 | 104 | 0.2436 | 25850.6 |
| 3 | 90 | 90 | 85 | 104 | 0.2216 | 16706.6 |
| 4 | 90 | 90 | 85 | 104 | 0.2278 | 18138.3 |
| 5 | 80 | 80 | 75 | 80 | 0.2518 | 23821.3 |
| 6 | 90 | 90 | 75 | 80 | 0.2163 | 14992.1 |
| 7 | 85 | 85 | 80 | 104 | 0.237 | 19387.5 |
| 8 | 80 | 90 | 75 | 80 | 0.2458 | 21717.7 |
| 9 | 90 | 80 | 75 | 85 | 0.2091 | 13092.1 |
| 10 | 80 | 80 | 85 | 90 | 0.2518 | 24777.1 |
| 11 | 85 | 85 | 80 | 104 | 0.2328 | 19065.7 |
| 12 | 90 | 80 | 75 | 80 | 0.2161 | 12855.7 |
| 13 | 90 | 80 | 85 | 90 | 0.1331 | 6234.8 |
| 14 | 80 | 80 | 85 | 80 | 0.2444 | 23395.8 |
| 15 | 90 | 90 | 75 | 80 | 0.2161 | 12322.4 |
| 16 | 80 | 90 | 75 | 90 | 0.2728 | 29065.4 |
| 17 | 80 | 90 | 85 | 85 | 0.2583 | 26035.7 |
| 18 | 80 | 80 | 75 | 90 | 0.2466 | 24827 |

The equivalents of extruder rpm (%), mixture feed rate (%) and extruder barrel water rate (%) are presented below:

Extruder rpm:

80%=267 rpm

85%=284 rpm

90%=301 rpm

Extruder Feed Rate:

75%=15 lb/min

80%=16 lb/min

85%=17 lb/min

Extruder Barrel Water Rate:

80%=4.8 lb/min

85%=5.1 lb/min

90%=5.4 lb/min

Example 2

This example illustrates the preparation of Soy Protein and Whey Protein (Isolate and Concentrate) nuggets; and combinations of both proteins at different ratios comprising a minimum level of 70% protein in the final nugget product.

Soy Protein Isolate, SUPRO® 8000, from The Solae Company (St. Louis, Mo.), 88% protein, (as is).

Whey Protein Isolate BiPro, from Davisco Foods, Inc (Eden Prairie, Minn.), 90% protein, (as is).

Whey Protein Concentrate WPC80, from Farbest Brands (Plain City, Ohio), 78% protein, (as is).

Native Tapioca Starch, from Avebe Corp. (Princeton, N.J.).

Dicalcium Phosphate, from Astaris Food Phosphates (Webster Groves, Mo.).

Soy Lecithin Powder, from The Solae Company (St. Louis, Mo.).

TABLE 8

| Ingredients | Sample 1 | Sample 2 | Sample 3 | Sample 4 | Sample 5 |
|---|---|---|---|---|---|
| Supro ® 8000 ISP | 80.0% | 70.0% | 40.0% | 60.0% | 20.0% |
| Nat. Tapioca Starch | 19.7% | 19.7% | 19.7% | 19.7% | 19.7% |
| Whey Protein Isolate Bipro | 0.0% | 10.0% | 40.0% | 20.0% | 60.0% |
| Dicalcium Phosphate | 0.3% | 0.3% | 0.3% | 0.3% | 0.3% |

TABLE 9

| Ingredients | Sample 6 | Sample 7 | Sample 8 | Sample 9 | Sample 10 | Sample 11 | Sample 12 |
|---|---|---|---|---|---|---|---|
| Supro 8000 ISP | 80.0% | 68.0% | 60.0% | 79.0% | 79.0% | 75.0% | 0.0% |
| Nat. Tapioca Starch | 19.7% | 18.7% | 16.7% | 0.0% | 0.0% | 10.0% | 10.0% |
| Whey Prot. Conc. WPC80 | 0.0% | 13.0% | 23.0% | 20.0% | 0.0% | 15.0% | 50.0% |
| Whey Protein Isolate Bipro | 0.0% | 0.0% | 0.0% | 0.0% | 20.0% | 0.0% | 40.0% |
| Dicalcium Phosphate | 0.3% | 0.3% | 0.3% | 0.5% | 0.5% | 0.0% | 0.0% |
| Soy Lecithin powder | 0.0% | 0.0% | 0.0% | 0.5% | 0.5% | 0.0% | 0.0% |

Samples 1 and 6 contained the same ingredients and amounts.

The following procedure was followed to produce final products (nuggets) compromising a minimum of 70% protein.

Each sample was blended in a horizontal ribbon blender Model TD415 (Dodge of Mishawaka, Ind.) with 300 Lb capacity. Each ingredient was weighted in a scale with 150 Lb capacity and 0.01 Lb sensitivity. The ingredients were added to the blender and blended for 20 minutes to ensure uniform distribution.

Each sample was manually fed to the extruder hopper and then each of Samples 1-5 was fed to the preconditioner at 50 KG/Hr (1.84 Lb/Min) and each of Samples 6-12 at 55 KG/Hr (2.02 Lb/Min).

No steam was used in the preconditioner for Samples 1-4; steam was injected for Sample 5, achieving (60° C.-70° C.) preconditioner temperature. For Samples 6-12 steam was used to achieve temperatures ranging from (43° C.-58° C.); the temperature was measured by a thermocouple positioned at the preconditioner discharge.

Water was added to the preconditioner and maintained constant in all the variables at 5.5 Kg/Hr (0.20 Lb/Min). The residence time of dry formulations in the preconditioner was about 4 minutes.

The preconditioned dry formulations were fed at 50 Kg/Hr and 55 Kg/Hr to the extruder using a transition to prevent waste, dust and ensure consistent flow to the extruder.

A Wenger TX-52 twin-screw extruder (13.5/1 L/D ratio) manufactured by Wenger Manufacturing Inc. (Sabetha, Kans.) was used for the production of these products.

Barrel temperatures were maintained about the same in all variables:

Zone 1 feeding (60° C.-70° C.); Zone 2 (80° C.-90° C.); Zone 3 (95° C.-110° C.); and Die head (100° C.-120° C.).

The product was cut by a 6 blades cutter at 3000-3200 rpm.

The die used for these experiments is a Y adapter which holds an insert die holder with one insert with 3 holes (1.5 mm diameter).

The screw configuration used in the example was divided into four sections. The first section was conveying; the second section was mixing and shearing; the third section was compressing; and, the fourth section was shearing and compressing.

Water was pumped into the first section of the extruder at different rates to obtain uniform nugget type shape products with uniform surface. Extruder screw speed and water rate were the main variables adjusted to obtain the shape and product density (<0.4 g/cc).

Wet density was measured using an 1150 ml metal container. Wet density was used as reference to modify processing conditions, in particular, screw speed and/or water rate.

Table 10 shows the correlation of samples to water rate, extruder screw speed, and wet and dry product density.

TABLE 10

| Sample | Water rate Lb/Min | Extruder Screw Speed rpm | Wet Density g/cc | Dry Density g/cc |
|---|---|---|---|---|
| Sample 2 | 0.54 | 410 | 0.288 | 0.290 |
| Sample 3 | 0.74 | 547 | 0.383 | 0.377 |
| Sample 4 | 0.58 | 531 | 0.356 | 0.382 |
| Sample 5 | 0.67 | 495 | 0.378 | 0.399 |
| Sample 1 & Sample 6 | 0.45 | 330-350 | 0.223 | 0.203 |
| Sample 7 | 0.50 | 430 | 0.266 | 0.267 |
| Sample 8 | 0.57 | 503 | 0.293 | 0.271 |
| Sample 9 | 0.79 | 469 | 0.335 | 0.349 |
| Sample 10 | 0.94 | 470 | 0.339 | 0.355 |
| Sample 11 | 0.65 | 470 | 0.248 | 0.248 |
| Sample 12 | 0.97 | 457 | 0.331 | 0.338 |

The product was dried in a continuous single pass Proctor Dryer at 121° C. (250° F.) at different residence times to achieve <5.0% product moisture. Table 11 shows this information.

TABLE 11

| Drying information: | | | |
|---|---|---|---|
| Sample | Dryer Setting (1-10) | Drying Time "Min" | Product Moisture % |
| Sample 2 | 4.0 | 22.5 | 1.82 |
| Sample 3 | 4.0 | 22.5 | 2.79 |
| Sample 4 | 4.0 | 22.5 | 2.42 |
| Sample 5 | 4.0 | 22.5 | 2.45 |
| Sample 1 & Sample 6 | 6.0 | 16.0 | 3.37 |
| Sample 7 | 5.5 | 17.0 | 3.08 |
| Sample 8 | 5.5 | 17.0 | 3.77 |
| Sample 9 | 5.5 | 17.0 | 4.17 |
| Sample 10 | 5.5 | 17.0 | 3.87 |
| Sample 11 | 5.5 | 17.0 | 3.28 |
| Sample 12 | 5.5 | 17.0 | 2.90 |

After drying the product was packaged and analyzed.

A gated Cox funnel was used to feed the container to minimize human manipulation while releasing the sample to a metal pint container in order to calculate the density; the results are presented in Tables 12 and 13.

Color measurements were taken using a LabScan XE Model LSXE (HunterLab; Naperville, Ill.).

Granulation was determined using a Rotap model FX-29 (W.S. Tyler; Mentor, Ohio).

The texture of the protein extrudate product was analyzed using the texture analysis model TA-XT2i (Texture Technologies Corp; New York, N.Y.).

Moisture analyzer IR120 (Denver Instruments; Goettingen, Germany) was used to determine moisture content.

The results are shown in Tables 12 and 13.

TABLE 12

| | Sample | | | | |
|---|---|---|---|---|---|
| | Sample 1 | Sample 2 | Sample 3 | Sample 4 | Sample 5 |
| Density g/cc | 0.203 | 0.290 | 0.377 | 0.382 | 0.399 |
| Color Hunter | | | | | |
| L value | 54.12 | 57.42 | 62.18 | 58.55 | 66.76 |
| A value | 3.21 | 2.62 | 2.34 | 2.30 | 1.63 |
| B value | 18.81 | 19.00 | 20.93 | 19.40 | 20.48 |
| Moisture % | 3.37 | 1.82 | 2.79 | 2.42 | 2.45 |
| Granulation % | | | | | |
| On U.S. #4 | 23.38 | 0.00 | 0.00 | 0.00 | 0.47 |
| On U.S. #6 | 76.08 | 83.01 | 0.14 | 0.82 | 0.98 |
| On U.S. #8 | 0.42 | 16.99 | 99.77 | 99.15 | 98.00 |
| Pan | 0.12 | 0.00 | 0.09 | 0.03 | 0.55 |
| Texture Analysis | | | | | |
| Force (g) | 7486 | 20051 | 51158 | 44306 | 49568 |

TABLE 13

| | Sample | | | | | | |
|---|---|---|---|---|---|---|---|
| | Sample 6 | Sample 7 | Sample 8 | Sample 9 | Sample 10 | Sample 11 | Sample 12 |
| Density g/cc | 0.203 | 0.267 | 0.271 | 0.349 | 0.355 | 0.248 | 0.338 |
| Color Hunter | | | | | | | |
| L value | 54.12 | 56.79 | 58.10 | 57.69 | 55.73 | 56.66 | 57.94 |
| A value | 3.21 | 3.13 | 3.59 | 3.85 | 3.63 | 3.48 | 3.52 |

TABLE 13-continued

| | Sample | | | | | | |
|---|---|---|---|---|---|---|---|
| | Sample 6 | Sample 7 | Sample 8 | Sample 9 | Sample 10 | Sample 11 | Sample 12 |
| B value | 18.81 | 19.46 | 21.07 | 21.57 | 20.66 | 19.64 | 25.26 |
| Moisture % | 3.37 | 3.08 | 3.77 | 4.17 | 3.87 | 3.28 | 2.90 |
| Granulation % | | | | | | | |
| On U.S. #4 | 23.38 | 0.17 | 0.01 | 0.00 | 0.00 | 0.03 | 0.02 |
| On U.S. #6 | 76.08 | 99.58 | 99.78 | 0.03 | 0.15 | 99.04 | 0.11 |
| On U.S. #8 | 0.42 | 0.20 | 0.17 | 39.61 | 43.69 | 0.81 | 98.11 |
| Pan | 0.12 | 0.05 | 0.04 | 60.59 | 56.33 | 0.18 | 1.90 |
| Texture Analysis | | | | | | | |
| Force (g) | 7486 | 19571 | 20774 | | | 17353 | 50081 |

All the samples described in Tables 12 and 13 were within the density limits <0.4 g/cc.

Example 3

Textured soy/calcium caseinate or soy/sodium caseinate and caseinate products were prepared at different ratios and protein levels, from 70% to 90% with various dry feed samples as presented in Tables 14 and 15. At 70% soy/caseinate textured products, the ratios of soy protein isolate (SPI) to calcium-caseinate, and soy protein isolate to sodium-caseinate in the dry feed samples were 5:1, 2:1, 1:1, and 1:2. The control 70% and 80% soy protein texture products had 5:1 ratios of hydrolyzed to unhydrolyzed soy protein isolate in the dry mix samples. The 80% and 90% soy/calcium caseinate or soy/sodium caseinate textured products also had 5:1 and 5.67:1 in the dry mix samples. In the 80% and 90% calcium caseinate or sodium caseinate extruded products, the dry mix had no soy protein in the samples as presented in Table 15.

TABLE 14

Soy and Soy/Caseinate Proteins Formulations with 70% Protein at Different Ratios.

| | Sample 13 (%) | Sample 14 (%) | Sample 15 (%) | Sample 16 (%) | Sample 17 (%) | Sample 18 (%) | Sample 19 (%) | Sample 20 (%) | Sample 21 (%) |
|---|---|---|---|---|---|---|---|---|---|
| SUPRO ® 8000 | 68.3 | 68.3 | 54.7 | 41.0 | 27.3 | 68.3 | 54.7 | 41.0 | 27.3 |
| Supro ® 248 | 13.7 | — | — | — | — | — | — | — | — |
| Ca-Caseinate | — | 13.7 | 27.3 | 41.0 | 54.7 | — | — | — | — |
| Na-Caseinate | — | — | — | — | — | 13.7 | 27.3 | 41.0 | 54.7 |
| Tapioca Starch | 15.7 | 15.7 | 15.7 | 15.7 | 15.7 | 15.7 | 15.7 | 15.7 | 15.7 |
| Fibrim 2000 | 2.0 | 2.0 | 2.0 | 2.0 | 2.0 | 2.0 | 2.0 | 2.0 | 2.0 |
| Dicalcium $PO_4$ | 0.2 | 0.2 | 0.2 | 0.2 | 0.2 | 0.2 | 0.2 | 0.2 | 0.2 |
| Salt (NaCl) | 0.1 | 0.1 | 0.1 | 0.1 | 0.1 | 0.1 | 0.1 | 0.1 | 0.1 |

The ingredients for each dry feed mixture were mixed in an Eagle Vertical blender for 40 minutes to ensure uniform distribution and fed manually to the volumetric feeder or hopper. From the hopper, the dry mix was conveyed with an auger to the pre-conditioner inlet and gravitationally fed into the conditioning cylinder at a rate of 0.80 to 1.10 kg/min (1.76-2.42 lb/min). The water was introduced into the conditioning cylinder at the rate of 0.07 to 0.25 kg/min (0.15-0.55 lb/min), and steam was injected into the conditioning cylinder at the rate of 0.05-0.15 kg/min (0.11-0.33 lb/min). The steam flow into the conditioning cylinder is carefully monitored and maintained at 60° C. to 70° C. (140° F.-160° F.) to prevent gelatinization of starch and the release of starch hydroxyl groups that will interact with the functional groups of proteins to form lumps. High temperatures and water are also known to initiate protein-protein interactions and lumps formation. The lumps are known to impede the smooth flow characteristics of the dry mix by blocking the feed trough. The conditioning cylinder paddles rotating at 680-720 rpm continuously stirred and conveyed the conditioned dry mix to the outlet, and gravitationally fed into the extruder barrel (inlet). The conditioned dry feed mix was introduced into the extruder barrel at a rate of 0.80 to 1.10 kg/min (1.76-2.42 lb/min) using the extruder screw speed of from 275-450 rpm.

The extruder used in the example was a Wenger TX 52 manufactured by Wenger, Inc. (Sabetha, Kans.) with a double barrel twin screw, L/D ratio of 13.5:1 and four heating zones. The screw configuration used in the example was divided into four section. The first section was conveying; the second section was mixing and shearing; the third section was compressing; and, the fourth section was shearing and compressing. Water is introduced into the extruder barrel at a rate of 0.17-0.30 kg/min (0.37-0.66 lb/min) without steam injection. The extruder barrel temperatures in zones 3 and 4 were controlled by water.

The temperature profile of the Wenger TX 52 is presented in Table 16.

TABLE 16

Wenger TX 52 Extruder Barrel Temperatures.

| Pre-Conditioner ° C. | Extrusion Zone 1 ° C. | Extrusion Zone 2 ° C. | Extrusion Zone 3 ° C. | Extrusion Zone 4 ° C. |
| --- | --- | --- | --- | --- |
| 60-70 (140-158° F.) | 20-30 (68-86° F.) | 40-80 (104-176° F.) | 50-105 (122-221° F.) | 60-130 (140-266° F.) |

The dry feed mixes with ≥1.1 ratios (soy protein/caseinate) in the samples did not utilize steam in the conditioning cylinder. The processing temperatures in the extruder barrel zones, most especially zones 3 and 4, were also below 90° C. (194° F.). The high dairy protein dry mixes were sensitive to high temperatures, shear and pressures. These dry mixes also expanded even at low temperatures, shear and pressure.

The conditioned dry feed mix was texturized or cooked in the extruder barrel with mechanical energy generated from the extruder screw speed and shear at high temperatures to reach the glass transition temperature. At high temperatures, shear and pressure, the dry feed mix melts and interacts with water and other ingredients to form a pseudoplastic like material which is extruded through a Y-adapter backup plate having a diameter of 0.125 inches (3.125 mm) before passing through the extrusion die with 1.5 mm or 2 mm diameter holes. Also, 1×3 mm or 1×4 mm oval die holes were used in the study. The extrudates coming out of the die holes are cut with a six (6) flexible bladed knife rotating at 1500-3500 rpm to obtain the product size, density and granulation. A variety of extruded products (nuggets, cereal, expanded snacks, etc.) were obtained depending on the knife speed.

The extruded products were dried with a single band Proctor dryer (Proctor & Schartz, SCM Corporation, Philadelphia, Pa.) at temperatures of about 115° C.-136° C. (240° F.-277° F.) and residence time of 13-20 min. The dried

TABLE 15

Soy, Soy/Caseinate and Caseinate Proteins Formulations at 80% and 90% Protein Levels.

| | Sample 22 (%) | Sample 23 (%) | Sample 24 (%) | Sample 25 (%) | Sample 26 (%) | Sample 27 (%) | Sample 28 (%) | Sample 29 (%) | Sample 30 (%) |
| --- | --- | --- | --- | --- | --- | --- | --- | --- | --- |
| SUPRO ® 8000 | 75.5 | 75.5 | 75.5 | 85.0 | 85.0 | — | — | — | — |
| SUPRO ® 248 | 15.1 | — | — | — | — | — | — | — | — |
| Ca-Caseinate | — | 15.1 | — | 14.7 | — | 90.6 | — | 99.7 | — |
| Na-Caseinate | — | — | 15.1 | — | 14.7 | — | 90.6 | — | 99.7 |
| Tapioca Starch | 9.1 | 15.7 | 15.7 | — | — | 9.1 | 9.1 | — | — |
| Soy Lecithin | — | | | | | | | | |
| Dicalcium PO$_4$ | 0.2 | 0.2 | 0.2 | 0.2 | 0.2 | 0.2 | 0.2 | 0.2 | 0.2 |
| Salt (NaCl) | 0.1 | 0.1 | 0.1 | 0.1 | 0.1 | 0.1 | 0.1 | 0.1 | 0.1 | extruded products were sieved using a US #3 and US #8 Sweco sieves to remove the fines.

The texture or hardness of the extruded products was determined using a Texture Analyzer, Model #TA.TXT2 with a 25 kg load cell manufactured by Stable Micro Systems Ltd. (England). The density and texture of 70%, 75%, 80%, 85% and 90% soy protein nuggets are presented in Table 17.

TABLE 17

Density and Texture of High Soy Protein Nuggets.

| Protein (%) | Density (g/cc) | Texture (g) |
| --- | --- | --- |
| 70 | 0.235 | 21680.1 |
| 75 | 0.247 | 23918.7 |
| 80 | 0.256 | 25230.2 |
| 85 | 0.234 | 22526.4 |
| 90 | 0.257 | 24201.0 |

The physical properties (density, texture, color and particle size distribution) of extruded 70% soy, soy/caseinate protein products at different protein ratios are presented in Table 18. Whereas, the physical properties of extruded 80% and 90% soy, soy/caseinate and caseinate products are presented in Table 19.

TABLE 18

Physical Characteristics of 70% Soy and Soy/Caseinate Protein Nuggets at Different Protein Ratios.

| | Sample: | | | | | | | | |
|---|---|---|---|---|---|---|---|---|---|
| | 13 70% Prot | 14 70% Prot | 15 70% Prot | 16 70% Prot | 17 70% Prot | 18 70% Prot | 19 70% Prot | 20 70% Prot | 21 70% |
| Density (g/cc) | 0.236 | 0.252 | 0.204 | 0.155 | 0.095 | 0.200 | 0.244 | 0.127 | 0.106 |
| Density (lb. cu. ft.) | 14.719 | 15.729 | 12.74 | 9.660 | 5.935 | 12.447 | 15.250 | 7.948 | 6.615 |
| Color | | | | | | | | | |
| L Value | 56.67 | 58.19 | 58.78 | 71.25 | 66.22 | 56.97 | 64.02 | 69.36 | 72.35 |
| A Value | 3.11 | 3.08 | 2.92 | 1.17 | 0.97 | 2.77 | 1.26 | 0.55 | −0.53 |
| B Value | 18.92 | 19.64 | 20.00 | 17.49 | 20.12 | 19.23 | 17.54 | 18.00 | 18.82 |
| Granulation % | | | | | | | | | |
| US#4 | 0.36 | 0.00 | 29.63 | 25.01 | 100.04 | 3.67 | 0.32 | 96.41 | 91.79 |
| US#6 | 98.62 | 98.5 | 70.34 | 74.51 | 0.13 | 96.12 | 98.42 | 3.74 | 5.8 |
| US#8 | 0.67 | 1.40 | 0.16 | 0.06 | 0.03 | 0.38 | 1.06 | 0.01 | 2.22 |
| PAN | 0.17 | 0.41 | 0.17 | 0.36 | 0.14 | 0.11 | 0.24 | 0.2 | 0.65 |
| Texture Analyser | | | | | | | | | |
| FORCE (g) | 8931.7 | 12630.5 | 7486.6 | 20564.9 | 9915.7 | 5128.32 | 26873.1 | 27809.7 | 23794 |

TABLE 19

Physical Characteristics of 80% and 90% Soy, Soy/Caseinate and Caseinate Protein Nuggets.

| | Sample: | | | | | | |
|---|---|---|---|---|---|---|---|
| | 22 80% Protein | 23 80% Protein | 24 80% Protein | 25 90% Protein | 26 90% Protein | 27 & 28 80% Protein | 29 & 30 90% Protein |
| Density (g/cc) | 0.122 | 0.103 | 0.130 | 0.110 | 0.170 | 0.092 | 0.097 |
| Density (lb. cu. ft.) | 7.582 | 6.443 | 8.106 | 6.878 | 10.50 | 5.741 | 6.053 |
| Color | | | | | | | |
| L Value | 56.71 | 57.56 | 58.31 | 57.48 | 55.50 | 70.25 | 72.35 |
| A Value | 2.44 | 2.80 | 2.12 | 2.86 | 2.49 | 0.66 | −0.39 |
| B Value | 18.09 | 19.40 | 18.65 | 19.80 | 18.82 | 19.30 | 18.32 |
| Granulation % | | | | | | | |
| US#4 | 0.14 | 0.29 | 0.00 | 0.03 | 0.00 | 100.0 | 100.0 |
| US#6 | 96.79 | 99.62 | 83.77 | 77.75 | 1.34 | 0.03 | 0.01 |
| US#8 | 3.26 | 0.27 | 15.94 | 22.10 | 98.21 | 0.01 | 0.00 |
| PAN | 0.12 | 0.13 | 0.63 | 0.37 | 0.62 | 0.01 | 0.00 |
| Texture Analyser | | | | | | | |
| FORCE (g) | 24678.39 | 10142.95 | 31486.86 | 22914.78 | 48268.37 | 7249.24 | 5465.67 |

Example 4

This example illustrates the preparation of a soy protein nugget comprised of greater than 70% protein using unhydrolyzed soy protein in various feed mixture formulations with a resultant nugget density of between 0.10 and 0.40 g/cc. The feed mixtures are described below in Table 20.

TABLE 20

| Feed Composition | | 72% Protein Product |
|---|---|---|
| SUPRO ® 620 | 79.8% | 79.4% |
| Native Tapioca Starch | 18.8% | 10.0% |
| Rice Flour | | 10.3% |
| Fibrim | 1.1% | |
| Salt | 0.3% | 0.3% |

The ingredients of each feed mixture were mixed in an ingredient blender for 45 minutes to ensure uniform distribution. The dry feed mixture was then dumped into totes to be transported to the feed hopper of a loss-in-weight feeder and fed to the pre-conditioning cylinder at a rate of 59.6 to 60.1 kg/hr (131.4-132.5 lb/hr) in which the dry mix was pre-conditioned with water. Water was introduced to the pre-conditioner at a rate of 15.7 kg/hr. The mixture in the pre-conditioner was continuously stirred with a paddle rotating at 700 rpm.

The conditioned feed mix was then introduced to the inlet of the extruder barrel inlet by gravity at a rate of 75.3-75.8 kg/hr (166-167 lb/hr). The extruder was a twin-screw extruder, Wenger TX-52 manufactured by Wenger, Inc (Sabetha, Kans.) having an L/D ratio of 13.5:1, 4 cooling zones and a screw speed of 427 to 432 rpm. The temperature of each barrel zone is described in Table 21.

TABLE 21

| Formula | Zone 1 Temp. (° C.) | Zone 2 Temp. (° C.) | Zone 3 Temp. (° C.) | Zone 4 Temp. (° C.) | Die Temp. (° C.) |
|---|---|---|---|---|---|
| Fibrim | Not Recorded | 55-56 | 98-99 | 101-103 | 101-104 |

TABLE 21-continued

| Formula | Zone 1 Temp. (° C.) | Zone 2 Temp. (° C.) | Zone 3 Temp. (° C.) | Zone 4 Temp. (° C.) | Die Temp. (° C.) |
|---|---|---|---|---|---|
| Rice Flour | Not Recorded | 55 | 97 | 100-101 | 101-102 |

The conditioned feed mix was cooked in the extruder barrel with mechanical energy generated from the screw rpm/shear to reach the glass transition temperature. At high temperatures, shear and pressure the feed mix melts and interacts with water and other ingredients to form a plastic like material before passing through an extrusion die. The extrudate was cut using a 6 blade knife at 1994 to 2163 rpm.

The extrudate was pneumatically conveyed to a Proctor Schwartz single belt conveyor dryer where the nugget was dried for approximately 16 minutes at 250° F. The density and color of the resultant nugget is shown in Table 22.

TABLE 22

| Formulation | Density (g/cc) | Color L | Color A | Color B |
|---|---|---|---|---|
| 72% Protein with Fibrim | 0.32 | 60.8 | 2.69 | 20.02 |
| 72% Protein with Rice Flour | 0.31 | 62.0 | 2.56 | 20.03 |

Example 5

This example illustrates the preparation of soy protein nuggets comprising different levels of cocoa powder to deliver flavor and color in the final nuggets and comprising different levels of soy protein isolate (hydrolyzed/unhydrolyzed) to yield 75% to 82% protein in final product.

TABLE 23

| | Sample | | | | |
|---|---|---|---|---|---|
| Ingredient | -31 | -32 | -33 | 34 | 35 |
| SUPRO ® 8000 ISP | 89.0% | 89.0% | 85.0% | 85.0% | 77.7% |
| SUPRO ® 620 ISP | 0.0% | 0.0% | 0.0% | 0.0% | 9.0% |
| Cocoa Powder | 5.0% | 6.5% | 8.0% | 8.0% | 7.0% |
| Native Tapioca Starch | 5.7% | 4.2% | 6.7% | 0.0% | 6.0% |
| Rice flour | 0.0% | 0.0% | 0.0% | 6.7% | 0.0% |
| Dicalcium phosphate | 0.3% | 0.3% | 0.3% | 0.3% | 0.3% |

TABLE 24

| | sample | | | | |
|---|---|---|---|---|---|
| Ingredient | 107 - 02 | 107 - 03 | 108 - 01 | 108 - 02 | 108 - 03 |
| SUPRO ®8000 ISP | 87.7% | 85.7% | 86.0% | 86.0% | 86.0% |
| SUPRO ®620 ISP | 5.0% | 5.0% | 0.0% | 0.0% | 0.0% |
| Cocoa Powder | 7.0% | 7.0% | 1.0% | 3.0% | 7.0% |
| Native Tapioca Starch | 0.0% | 0.0% | 12.7% | 10.7% | 6.7% |
| Soy Fiber | 0.0% | 2.0% | 0.0% | 0.0% | 0.0% |
| Dicalcium phosphate | 0.3% | 0.3% | 0.3% | 0.3% | 0.3% |

As show in Tables 23 and 24, the main ingredient to produce High Protein Nuggets with Cocoa is SUPRO® 8000, (The Solae Company, St. Louis, Mo.) this is a hydrolyzed isolate, similar to SUPRO® 670; Native Tapioca Starch, Rice Flour and Soy Fiber function as developing the expansion in extrusion.

SUPRO® 620, Cocoa Powder (Bloomer Chocolate, (Chicago, Ill.) and Dicalcium Phosphate have the ability to modify the cell structure of the final product. They reduce the texture cell size resulting in denser final products.

The ingredients of each mixture were mixed in a blender for about 20-30 minutes to insure uniform distribution. The dry feed was manually fed to the extruder hopper, and then fed to a preconditioner at 1.8-2.2 LB/Min. Steam was added to the preconditioner to help the ingredients get pre-hydrated prior to extrusion. Steam was added to obtain a temperature between about 38° C. to about 71° C. (100° F. to 160° F.) at the preconditioner discharge. The steam addition was adjusted to the cylinder to achieve the right final product density; the addition of steam helps to obtain improved expansion.

The preconditioned dry mix was introduced to the extruder throughout a transition to minimize waste and dust. The extruder rate was the same as the rate fed to the preconditioner (1.8-2.2 LB/Min), when stable conditions are maintained. The dry mix residence time in the preconditioner was about 3-5 minutes.

The extruder used for the production of these products was a three zones and a head section twin-screw extruder, Wenger Model TX-52 manufactured by Wenger Manufacturing Inc. (Sabetha, Kans.) with a 13.5/1 L/D ratio.

The screw configuration used in the example was divided into four sections. The first section was conveying; the second section was mixing and shearing; the third section was compressing; and, the fourth section was shearing and compressing.

Water was pumped into the first extruder barrel at 0.40-0.60 Lb/Min. The barrel temperatures obtained were generated by the extruder set up, shear and mechanical energy introduced to the system. These products can also be produced using external heating such as electrical heating, steam injection and hot oil controlled by a Mokon unit.

Extruder temperatures are normally Zone 1 "feeding" 38° C.-71° C. (100° F.-160° F.); Zone 2 77° C.-99° C. (170° F.-210° F.); Zone 3 104° C.-121° C. (220° F.-250° F.) and cone head 104° C.-127° C. (220° F.-260° F.).

The dry mix was fed into the extruder and cooked by shear generated by screw configuration, die design, feed/liquid rate, the nature of ingredients and extruder rpm; normally running about 400-500 rpm to achieve the right product density and texture.

After the dry mix was cooked and extruded, it exited the die (one insert 1.5 mm diameter 3 holes); steam was released creating product expansion, the product was face cut by a six (6) blade cutter holder at about 2500-3200 rpm to achieve the desired product particle size.

The product was dried in a continuous single pass Proctor Dryer at 121° C. (250° F.) for about 15 to 20 minutes to obtain less than 5.0% product moisture. Then the product was packaged and analyzed.

The results of this analysis are in Tables 25 & 26:

TABLE 25

| | Sample | | | |
|---|---|---|---|---|
| | 31 | 32 | 33 | 34 |
| Density g/cc | 0.275 | 0.288 | 0.245 | 0.280 |
| Color Hunter | | | | |
| L value | 21.57 | 20.55 | 19.59 | 19.82 |
| A value | 1.87 | 1.68 | 1.46 | 1.66 |
| B value | 3.62 | 3.12 | 2.67 | 3.03 |
| Moisture (%) | 1.66 | 3.37 | 2.10 | 0.83 |

TABLE 25-continued

| | Sample | | | |
|---|---|---|---|---|
| | 31 | 32 | 33 | 34 |
| Granulation (%) | | | | |
| On U.S. #4 | 0.42 | 0.43 | 0.58 | 0.17 |
| On U.S. #6 | 77.03 | 87.86 | 93.15 | 1.00 |
| On U.S. #8 | 21.31 | 11.25 | 6.11 | 98.54 |
| Pan | 1.24 | 0.46 | 0.16 | 0.29 |
| Texture Analysis | | | | |
| Force (g) | 45832 | 44742 | 30132 | 38484 |

The amount and type of carbohydrates in formulation affected product density as observed in Table 25. Samples 31 and 32 produced denser samples than Sample 33. Sample 34 produced a denser sample than Sample 33, due to different starch "rice flour" in the sample (lack of product expansion, resulting in smaller particles and high percentage on U.S. #8 Screen).

The percentage differences of cocoa powder in these formulas are low and these minimum levels did not show any differences in product color.

TABLE 26

| | Sample | | |
|---|---|---|---|
| | 35 | 36 | 37 |
| Density g/cc | 0.273 | 0.330 | 0.350 |
| Color Hunter | | | |
| L value | 18.72 | 19.25 | 20.31 |
| A value | 1.41 | 1.67 | 1.75 |
| B value | 2.58 | 3.04 | 3.27 |
| Moisture (%) | 2.44 | 2.71 | 3.95 |
| Granulation (%) | | | |
| On U.S. #4 | 0.00 | 0.09 | 0.00 |
| On U.S. #6 | 25.46 | 4.04 | 1.81 |
| On U.S. #8 | 73.86 | 94.94 | 93.56 |
| Pan | 0.68 | 0.93 | 4.63 |

TABLE 26-continued

| | Sample | | |
|---|---|---|---|
| | 35 | 36 | 37 |
| Texture Analysis | | | |
| Force (g) | 23838 | 45172 | Maximized TA |

The elimination of tapioca starch from the samples produced higher density samples as seen in Samples 36 and 37 in Table 27. SUPRO® 620 in the samples produces higher density samples.

TABLE 27

| | Sample | | |
|---|---|---|---|
| | 38 | 39 | 40 |
| Density g/cc | 0.243 | 0.215 | 0.218 |
| Color Hunter | | | |
| L value | 33.61 | 24.85 | 16.64 |
| A value | 1.65 | 1.71 | 1.38 |
| B value | 8.00 | 4.54 | 2.77 |
| Moisture (%) | 1.13 | 1.51 | 2.28 |
| Granulation (%) | | | |
| On U.S. #4 | 0.10 | 0.00 | 0.21 |
| On U.S. #6 | 87.99 | 75.24 | 91.40 |
| On U.S. #8 | 11.45 | 24.13 | 8.25 |
| Pan | 0.46 | 0.63 | 0.14 |
| Texture Analysis | | | |
| Force (g) | 14003 | 12592 | 12287 |

The amount of native tapioca starch in all three samples was enough to produce samples under 0.25 g/cc in density. These samples show direct correlation between the levels of cocoa powder in formulation to Hunter color; in particular L and B values. Higher levels of cocoa powder in formulation produced darker samples (lower L values).

The texture force values were measured by a Texture Analyzer, Model # TA.TXT2 with 25 Kg load cell manufactured by Stable Micro Systems Ltd. (England).

Product density was directly related to the amount of protein and starch in the sample.

Higher percent protein in the sample yields a denser product; lower percent starch yields a denser product.

Processing conditions can be adjusted to change product density by reducing or increasing extruder rpm and/or water input to the process; these variables affected product density and texture.

TABLE 28

See data in the Table 27:

| | Sample | | | | | |
|---|---|---|---|---|---|---|
| | 38 | 38A | 39 | 39A | 40 | 40A |
| Density g/cc | 0.243 | 0.192 | 0.215 | 0.247 | 0.218 | 0.175 |
| TA: Force Values (g) | 14003 | 12165 | 12592 | 19586 | 12287 | 13054 |

TABLE 28-continued

See data in the Table 27:

| | Sample | | | | | |
|---|---|---|---|---|---|---|
| | 38 | 38A | 39 | 39A | 40 | 40A |
| Ext. Screw Speed rpm | 360 | 500 | 450 | 400 | 380 | 450 |
| Water rate Lb/Min | 0.44 | 0.44 | 0.46 | 0.48 | 0.53 | 0.42 |

The rest of the processing conditions were maintained constant (Feed rate 55 Kg/Hr, steam input same valve opening "Preconditioner temperature 8° C.-11° C. (47° F.-52° F.)", cutter speed 3300 rpm, dryer temperature, extruder barrel temperatures, etc.).

Preferred formulations are provided in the following formulation examples. All percents (%) are by weight.

Nutritional Bar (sheet and cut type)

| Ingredients | % |
|---|---|
| Marshmallow mixture | 39.0 |
| sugar | |
| polydextrose | |
| corn syrup | |
| margarine | |
| water | |
| corn syrup | |
| High soy protein nuggets | 31.5 |
| Dried Apples | 13.5 |
| Dried cranberries | 13.0 |
| Soybean oil | 2.0 |
| Cranberry juice concentrate | 1.0 |
| Total | 100 |

Acidic pH beverage

| Ingredients | % |
|---|---|
| Water | 84.59 |
| Sucrose | 4.29 |
| Ground, Comminuted high soy protein nuggets | 1.65 |
| Fructose | 2.91 |
| Carrot concentrate, 42 Brix | 4.02 |
| Citric acid | 0.10 |
| Pectin | 0.45 |
| Vitamin Premix | 1.09 |
| Phosphoric acid (75%) | 0.7 |
| Natural and Artificial Flavor | 0.2 |
| Total | 100.00 |

Ground meat, beef patties

| Ingredient | % |
|---|---|
| Beef Trim (10% Fat) | 59.00 |
| Beef Trim (15% Fat) | 10.00 |
| Beef Trim (50% Fat) | 25.00 |
| Water | 5.0 |
| Ground, Comminuted high soy protein nuggets | 1.0 |
| Total | 100.00 |

Smoked Italian Sausage

| Ingredients | % |
|---|---|
| Pork trimmings | 49.20 |
| Chicken (Mechanically deboned) | 15.00 |
| Pork fat trimmings | 10.00 |
| Water | 20.00 |
| Salt | 1.70 |
| Curing salt (6.25% NaNO$_2$) | 0.20 |
| Phosphate | 0.30 |
| Sodium ascorbate | 0.05 |
| Ground textured soy protein product | 1.60 |
| Non fat dry milk | 0.80 |
| Smoke flavor | 0.25 |
| Paprika powder | 0.25 |
| Fennel | 0.25 |
| Red pepper | 0.15 |
| White pepper | 0.15 |
| Anise | 0.10 |
| Total | 100.00 |

Smoked Sausage

| Ingredients | % |
|---|---|
| Pork picnics | 48.00 |
| Beef meat | 20.00 |
| Turkey (Mechanically deboned) | 10.00 |
| Water | 15.00 |
| Salt | 1.80 |
| Curing salt | 0.20 |
| Sodium ascorbate | 0.05 |
| Corn syrup solids | 1.50 |
| Ground textured soy protein product | 1.50 |
| Non fat dry milk | 1.50 |
| White pepper | 0.25 |
| Marjoram | 0.10 |
| Nutmeg | 0.10 |
| Total | 100.00 |

Beef Smoked Sausage

| Ingredients | % |
|---|---|
| Beef meat | 20.00 |
| Beef navels | 52.00 |
| Water | 20.00 |
| Salt | 2.10 |
| Curing salt (6.25% NaNO$_2$) | 0.15 |
| Sodium ascorbate | 0.05 |
| Corn syrup | 2.20 |
| Ground textured Soy protein product | 2.20 |

-continued

| Ingredients | % |
| --- | --- |
| Non fat dry milk powder | 0.60 |
| Onion powder | 0.20 |
| Seasoning | 0.50 |
| Total | 100.00 |

Variety Meat Smoked Sausage

| Ingredients | % |
| --- | --- |
| Beef tripe (flaked/ground) | 16.00 |
| Beef head meat (flaked/ground) | 10.00 |
| Beef meat (pre-cured) | 10.00 |
| Beef heart emulsion | 10.00 |
| Beef tongue | 16.00 |
| Pork meat (pre-cured) | 10.00 |
| Chicken (Mechanically deboned) | 10.00 |
| Water | 10.00 |
| Salt | 2.30 |
| Curing salt (6.25% NaNO$_2$) | 0.15 |
| Sodium ascorbate[2] | 0.05 |
| Corn syrup | 2.30 |
| Ground textured Soy protein product | 2.30 |
| Seasoning | 0.90 |
| Total | 100.00 |

The present invention is not limited to the above embodiments and can be variously modified. The above description of preferred embodiments is intended only to acquaint others skilled in the art with the invention, its principles and its practical application so that others skilled in the art may adapt and apply the invention in its numerous forms, as may be best suited to the requirements of a particular use.

With reference to the use of the word(s) "comprise" or "comprises" or "comprising" in this entire specification (including the claims below), it is noted that unless the context requires otherwise, those words are used on the basis and clear understanding that they are to be interpreted inclusively, rather than exclusively, and that it is intended each of those words to be so interpreted in construing this entire specification.

What is claimed is:

1. A protein extrudate comprising at least about 70% by weight protein on a moisture-free basis and between about .001% to about 5% fiber on a moisture free basis, wherein the only protein is unhydrolyzed soy protein, and having a density of from about 0.10 g/cm$^3$ to about 0.40 g/cm$^3$.

2. A protein extrudate comprising:
from about 55% to about 95% by weight protein and between about .001% to about 5% fiber on a moisture free basis, wherein the only protein is unhydrolyzed soy protein; the extrudate having a density in the range of about 0.02 g/cm$^3$ to about 0.5 g/cm$^3$.

3. The protein extrudate of claim 2, wherein said extrudate is further characterized by having a non-fibrous eating texture.

4. The protein extrudate of claim 2 wherein the extrudate includes filler present in a ratio of filler to protein in the range of between about 5:95 and about 75:25.

5. A food product comprising the protein extrudate of claim 1 and at least one of a flavoring, a fat, an antimicrobial agent, a nutrient, or a preservative.

6. The food product of claim 5 wherein the food product is a beverage, a health bar, a nutrition bar, a food bar, a ready to eat cereal, a dairy product, a baked product, a meat product, a soup or a gravy.

* * * * *